United States Patent [19]

Adaniya et al.

[11] Patent Number: 4,775,600
[45] Date of Patent: Oct. 4, 1988

[54] HIGHLY CORROSION-RESISTANT SURFACE-TREATED STEEL PLATE

[75] Inventors: Takeshi Adaniya; Masaaki Yamashita; Akira Enatsu; Takahiro Kubota, all of Tokyo; Norio Nikaido, Kanagawa; Yoshiaki Miyosawa, Kanagawa; Tadashi Nishimoto, Kanagawa; Kazuhiko Ozawa, Kanagawa, all of Japan

[73] Assignee: Nippon Kokan Kabushiki Kaisha, Tokyo, Japan

[21] Appl. No.: 932,771

[22] Filed: Nov. 18, 1986

[30] Foreign Application Priority Data

Mar. 27, 1986 [JP] Japan .................................. 61-69383
Jun. 30, 1986 [JP] Japan ................................. 61-152917
Jul. 18, 1986 [JP] Japan ................................. 61-170156
Jul. 18, 1986 [JP] Japan ................................. 61-170157
Sep. 11, 1986 [JP] Japan ................................. 61-212620

[51] Int. Cl.$^4$ ............................................ B32B 15/04
[52] U.S. Cl. .................................... 428/623; 428/626; 428/632; 428/659; 428/684
[58] Field of Search ............... 428/623, 626, 629, 632, 428/659, 681, 684

[56] References Cited

U.S. PATENT DOCUMENTS 4,407,899 10/1983 Hara et al. ........................... 428/623
4,411,964 10/1983 Hara et al. ........................... 428/623
4,659,394 4/1987 Hara et al. ........................... 428/623

OTHER PUBLICATIONS

The Advantages and Uses of Zincrometal in Automobile Bodies Oct. 1979 SAE Technical Paper Series "Organic-Silicate Composite Coated Steel Sheet for Automobile Body Panel" Dec. 1986.
Composite Pre-Coated Automobile Sheet Steel, Aug. 1986.

Primary Examiner—L. Dewayne Rutledge
Assistant Examiner—George Wyszomieirski
Attorney, Agent, or Firm—Henry C. Nields

[57] ABSTRACT

The present invention relates to a highly corrosion-resistant surface-treated steel plate. The steel plate of the present invention comprises a zinc deposition or zinc alloy deposition film as the undercoat deposition layer, a chromate film formed on the undercoat deposition layer and a film of a resin composition formed on the chromate film. This resin composition comprises a base resin formed by adding at least one basic nitrogen atom and at least two primary hydroxyl groups to terminals of an epoxy resin. The resin composition may comprise a polyisocyanate compound as the curing agent. Furthermore, the resin composition may comprise silica or a hardly soluble chromium compound as the additive for improving the corrosion resistance. Moreover, the resin composition may comprise a silane compound as the crosslinking agent for the base resin and silica.

74 Claims, No Drawings

HIGHLY CORROSION-RESISTANT SURFACE-TREATED STEEL PLATE

BACKGROUND OF THE INVENTION

Recently, a high corrosion resistance is required for a steel plate used for a car body, and there is a growing tendency that a surface-treated steel plate havingg a high corrosion resistance is used instead of a cold-rolled steel plate heretofore used.

As the surface-treated steel plate, a zinc-deposited steel plate can be first of all mentioned. In this deposited steel plate, in order to increase the corrosion resistance, the amount deposited of zinc should be increased. However, increase of the amount deposited of zinc results in degradation of the workability and weldability. As a steel plate overcoming this defect, there has been studied and developed a zinc alloy-deposited steel plate or multiple layer-deposited steel in which at least one element selected from the group consisting of Ni, Fe, Mn, Mo, Co, Al and Cr is added, and in steel plates of this type, the corrosion resistance can be improved over that of the above-mentioned zinc-deposited steel plate without degradation of the workability or weldability. When a steel plate is applied to a bag structure portion or curved portion (hemmed portion) of an inner plate of a car, a high corrosion resistance is required for the surface of the steel plate, and the above-mentioned zinc alloy-deposited steel plate or multiple layer-deposited steel plate is still insufficient in the corrosion resistance. A rust-preventive coated steel plate having a zinc-rich coating, as disclosed in Japanese Patent Publication No. 24230/70 or No. 6882/72, has been studied and developed as a steel plate having a high corrosion resistance, and a steel plate called "Zincrometal" is known as a typical instance of the steel plate of this type. However, even in this rust-preventive coated steel plate, peeling of the coating is often caused in a processed portion, for example, a portion subjected to press-forming, resulting in degradation of the corrosion resistance. Therefore, this coated steel plate is not sufficiently satisfactory as a highly anti-corrosive, rust-preventive coated steel plate meeting the requirement for a car body material.

Under this background, we newly developed a steel plate having a protecting film free of a metal powder such as a Zn powder in the form of a thin film (having a thickness smaller than several microns) based on the consideration that the improvement of the capacity of the rust-preventive coated steel plate by the zinc-rich coating layer is limited, and we proposed this new steel plate in Japanese Patent Application Laid-Open Specification Nos. 224174/83, 50179/85, 50180/85 and 50181/85. This steel plate is obtained by forming a chromate film and an organic composite silicate film as the topmost layer on a zinc-deposited or zinc alloy-deposited steel plate as the base. This coated steel plate is especially excellent in the workability and corrosion resistance.

A part (trunk lid, hood or the like) of the inner face of a car body is sometimes coated with at least tow coating layers including a topcoat formed on a cation electrodeposition coating. In case of the above-mentioned coated steel plate previously proposed by us, it is apprehended that the adhesion is insufficient in case of this multi-layer coating. Therefore, in Japanese Patent Application Laid-Open Specification No. 174879/85, we proposed a process in which the above-mentioned steel plate is improved and a rust-preventive steel plate for multi-layer coating excellent in the adhesion of the multi-layer coating is prepared.

According to this process, an organic polymer film is sufficiently crosslinked by baking at a high temperature of 250° to 350° C. to ensure an excellent adhesion to a multi-layer coating. If crosslinking of the polymeric film is insufficient, the film is softened and swollen by an alkali generated in the interface at the cation electrodeposition, resulting in degradation of the adhesion of the coating. This defect is overcome by crosslinking by high-temperature baking.

From the results of research made by us afterward, it was found that although in the above-mentioned steel plate an excellent adhesion to a multi-layered coating having at least two coating layers can be ensured by baking at a high temperature exceeding 250° C., the so-called bare corrosion resistance (uncoated corrosion resistance), that is, the corrosion resistance on the supposition that an electrodeposition coating layer is hardly formed, is insufficient and if the surface treatment coating film is damaged, for example, if a cross cut extending to the iron substrate is formed or the steel plate is subjected to deep-draw forming or draw beading, the bare corrosion resistance is somewhat inferior to that of the steel plate as disclosed in Japanese Patent Application Laid-Open Specification No. 224174/83 mentioned above.

In addition to excellent workability and weldability, the following properties are required for a highly corrosion-resistant surface-treated steel plate for a car body:

(1) A high corrosion resistance of a portion where an electrodeposition coating is hardly formed, such as a bag structure portion or a hemmed portion, that is, a high bare corrosion resistance.

(2) Good coating properties (high adhesion and high corrosion resistance of the coating) of a multi-layer coating including at least two coating layers (cation electrodeposition coating layer and topcoat layer) on the inner face of a trunk lid or hood.

At the present, the requirement for improving the corrosion resistance in a car body is increasing, and the above-mentioned steel plate cannot be regarded as satisfying this requirement sufficiently.

The present invention is to solve the foregoing problem and provide a highly corrosion-resistant surface-treated steel plate which has good workability and weldability and is excellent in bare corrosion resistance, adhesion to a multi-layer coating and corrosion resistance of the coating.

SUMMARY OF THE INVENTION

The present invention relates to a highly corrosion resistant surface-treated steel plate. More particularly, the present invention relates to a surface-treated steel plate suitable for a car body or the like.

This surface-treated steel plate comprises a zinc deposition layer or a zinc alloy deposition layer (such as a Zn-Ni alloy or Zn-Mn alloy deposition layer) as the undercoat deposition film, a chromate film formed on the surface of the undercoat deposition film and a film of a resin composition formed on the chromate film, which comprises a base resin formed by adding at least one basic nitrogen atom and at least two hydroxyl groups to terminals of an epoxy resin.

The resin composition may comprise a polyisocyanate compound as a curing agent.

In order to improve the corrosion resistance, silica may be added at a base resin/silica weight ratio of from 99/1 to 30/70, irrespectively of whether or not the polyisocyanate compound is incorporated.

Moreover, in order to further improve the corrosion resistance, a hardly soluble chromiun compound may be added at a base resin/hardly soluble chromium compound weight ratio of from 99/1 to 60/40 together with silica.

Furthermore, the resin composition film may comprise a silane compound together with the polyisocyanate compound and silica contained at the above-mentioned ratio. The silane compound acts as a crosslinking agent for the base resin and the silica component. In addition to these additives, the hardly soluble chromium compound may be incorporated at the above-mentioned ratio.

DETAILED DESCRIPTION OF THE INVENTION

The present invention will now be described in detail.

In the present invention, a zinc-deposited or zinc alloy-deposited steel plate is used as the starting material, and a chromate film is formed on the deposition layer and a basic epoxy resin film is formed on the chromate film.

As the starting zinc type deposited steel plate, there can be mentioned a zinc-deposited steel plate and a zinc alloy-deposited steel plate. As the zinc alloy-deposited steel plate, there can be mentioned a zinc/iron alloy-deposited steel plate, a zinc/nickel alloy-deposited steel plate, a zinc/manganese alloy-deposited steel plate, a zinc/aluminum alloy-deposited steel plate and a zinc/cobalt/chromium alloy-deposited steel plate. At least one member selected from the group consisting of Ni, Fe, Mn, Mo, Co, Al and Cr may be added to the foregoing deposition elements of steel plates. Furthermore, composite deposition steel plates comprising at least two deposition layers selected from the foregoing deposition layers, which may be the same or different, can be used. For example, a deposit film comprising at least two Fe/Zn alloy deposited layers differing in the Fe content may be used.

Among these deposited steel plates, a zinc/nickel alloy-deposited steel plate and a zinc/manganese alloy-deposited steel plate are especially preferred in view of the corrosion resistance. When these zinc alloy-deposited steel plates are used, it is preferred that the nickel content in the deposition film be 5 to 20% by weight in the zinc/nickel alloy-deposited steel plate and the manganese content in the deposition layer be 30 to 85% by weight in the zinc/manganese alloy-deposited steel plate.

Any of the electrolytic deposition process, the melt deposition process and the gas phase deposition method, that can be worked, may be adopted as the deposition method for the production of a zinc type deposited steel plate as described above. The rust-preventive steel plate intended in the present field, it is important that the deposition should be carried out so that the quality of a cold-rolled steel plate subjected to the deposition is not degraded. In view of this requirement, it will be understood that the electric deposition process in which no heat is generated is advantageous.

It is preferred that the amount deposited of chromium (dry base) in the chromate film be 1 to 1000 mg/m$^2$, especially 10 to 200 mg/m$^2$ (as calculated as metallic chromium). If the amount deposited of chromium exceeds 1000 mg/m$^2$, the workability and weldability are degraded, and if the amount deposited of chromium is smaller than 1 mg/m$^2$, there is a risk of formation of an uneven film. The presence of hexavalent chromium in the chromate film is present. Hexavalent chromium has a repairing action and when the steel plate is damaged, hexavalent chromium exerts a function of preventing corrosion from advancing from the damaged portion.

The chromate treatment for formation of this undercoat film may be accomplished by any of the reaction type treatment, the coating treatment and the electrolytic treatment.

A coating liquid for the coating treatment comprises a solution of partially reduced chromic acid as the main component, and if necessary, the treating liquid contains an organic resin such as a water-dispersible or water-soluble acrylic resin and/or silica having a particle size of several to several hundred millimicrons (colloidal silica or fused silica). It is preferred that the $Cr^{3+}/Cr^{6+}$ ratio be from 1/1 to ⅓ and the pH value be 1.5 to 4.0, especially 2 to 3. The $Cr^{3+}/Cr^{6+}$ ratio is adjusted to a predetermined value by using an ordinary reducing agent (such as a saccharide or an alcohol) or an inorganic reducing agent. The coating chromate treatment may be accomplished by a roll coater method, a dip coating method and a spray coating method. In the coating chromate treatment, drying is carried out without performing water washing, and a chromate film is obtained. The reason why drying is carried out without performing water washing is that $Cr^{6+}$ is removed by ordinary water washing. Namely, if drying is thus carried out without performing water washing, the $Cr^{3+}/Cr^{6+}$ ratio can be stably maintained, excessive flowout of $Cr^{6+}$ in a corrosive environment is controlled by a basic epoxy resin film formed on the chromate film and a passivating action can be maintained effectively over a long period to obtain a high corrosion-resisting action.

In the electrolytic chromate treatment, a cathode electrolytic treatment is carried out by using a treating liquid containing chromic anhydride and at least one member selected from anions such as sulfuric acid, phosphoric acid, fluorides and halogen oxyacids, and water washing and drying are carried out to form a film. When the chromate film is prepared according to the above-mentioned treatment methods, since the coating type chromate film contains hexavalent chromium in a larger amount than the electrolytic chromate film, the coating type chromate film is excellent in the corrosion resistance, and if the coatin type chromate film is heat-treated, as described hereinafter, the film is densified and the strength is increased, and the corrosion resistance is better than that of the electrolytic chromate film. The electrolytic chromate film is advantageous in that the completeness of the film is high irrespectively of whether or not the heat treatment is effected, and that the amount deposited of the film can be easily controlled. In view of the corrosion resistance, the coating type chromate film is most preferred. In a rust-preventive steel plate for a car body, in many cases, only one surface is treated. In view of this fact, the coating type chromate film and the electrolytic chromate film are preferred.

A basic epoxy resin film is formed on the chromate film.

The resin film is formed by heat-curing or dry-curing a film of a resin composition comprising a base resin obtained by adding at least one basic nitrogen atom and at least two primary hydroxyl groups to terminals of an epoxy resin.

The base resin will now be described in detail.

A resin composed mainly of a condensation product obtained by condensing bisphenol A with epichlorohydrin is preferred as the epoxy resin used as the base resin. As the epoxy resin, there can be mentioned an epoxy resin formed solely of an aliphatic structure or alicyclic structure, such as epoxidized oil or epoxybutadiene, but in order to obtain an excellent corrosion resistance, it is preferred that an epoxy resin composed mainly of the above-mentioned condensation product be used. As the epoxy resin, there can be used, for example, Epikotes 828, 1001, 1004, 1007, 1009 and 1010 (each being supplied by Shell Chemical). If curing at a low temperature is necessary, it is preferred than an epoxy resin having a number average molecular weight of at least 1500 be used. The foregoing Epikotes may be used singly or in the form of mixtures of two or more of them. As means for introducing basic nitrogen atoms and primary hydroxyl groups, there can be adopted a method in which an alkanolamine and/or an alkylalkanolamine is added to an oxirane group of the epoxy resin. As the amine, there can be mentioned monoethanolamine, diethanolamine, dimethylaminoethanol, monopropanolamine, dipropanolamine and dibutanolamine. These amines can be used singly or in the form of mixtures of two or more of them.

As another means, there may be adopted a method in which an epoxy resin is partially modified with another compound. In this case, however, it is indispensable that at least two moles of primary hydroxyl groups on the average should be incorporated into one molecule of the epoxy resin.

As the means for partial modification of the epoxy resin, there can be mentioned (1) esterification with a monocarboxylic acid (as the monocarboxylic acid, there can be mentioned saturated or unsaturated fatty acids such as coconut oil fatty acid, soybean oil fatty acid and castor oil fatty acid, low-molecular-weight aliphatic monocarboxylic acids such as acetic acid, propionic acid and butyric acid, and aromatic monocarboxylic acids such as benzoic acid), (2) modification with an aliphatic or aromatic amine (as the aliphatic or aromatic amine, there can be mentioned aliphatic amines such as monomethylamine, dimethylamine, monoethylamine, diethylamine and isopropylamine, and aromatic amines such as aniline), and (3) modification with a hydroxyacid (as the hydroxyacid, there can be mentioned lactic acid and γ-hydroxypropionic acid).

There can also be mentioned modification with a dicarboxylic acid such as adipic acid or sebacic acid. However, this method is not suitable for obtaining the film of the present invention, because the molecular weight of the epoxy resin is increased beyond a necessary level, control of the reaction for obtain a certain molecular weight distribution is difficult and no improvement of the corrosion resistance can be observed.

A water-dispersible or water-soluble composition formed by neutralizing the base of the epoxy resin as the base resin with a low-molecular-weight acid can also be used as the film-forming composition of the present invention.

However, in case of a film for a BH steel plate where drying at a low temperature below 250° C., especially drying at an extremely low temperature below 170° C., is required, it is preferred that the above neutralization be not effected but a composition formed by dissolving the resin in an organic solvent be used.

More specifically, in case of the water-dispersible or water-soluble composition, the acid compound necessary for the solubilization in water forms a salt in the film and in a wet environment, water is readily absorbed in or below the film. Furthermore, under a low temperature drying condition, a sufficiently tough film cannot be obtained, and the corrosion resistance and adhesion are somewhat inferior.

As the organic solvent, there can be used organic solvents customarily used in the field of paints, and they may be used singly or in the form of mixed solvents of two or more of them, but in view of the objects of the present invention, use of a high-boiling-point alcohol type solvent is not preferred. As such alcohol type solvents there can be mentioned, for example, ethylene glycol, diethylene glycol monoalkyl ethers and alcohols having at least 5 carbon atoms and a primary hydroxyl group. These solvents inhibit the curing reaction of the film. As preferred examples of the solvent, there can be mentioned hydrocarbon type solvents, ketone type solvents, ester type solvents and ether type solvents, and low-molecular weight alcohols having up to 4 carbon atoms and alcohols having a secondary or tertiary hydroxyl group are preferably used.

The reasons why a film of a resin composition comprising the above-mentioned base resin is formed in the present invention are as follows.

Namely, in order to obtain a high corrosion resistance and a high adhesion to a multi-layer coating including at least two layers, (1) an epoxy resin is adopted as the base resin so that a high adhesion to the substrate or cation electrodeposition coating and a high corrosion resistance can be obtained, and (2) by rendering the polarity of the resin basic, degradation of the resin structure by an alkali generated in the interface at the cation electrodeposition is prevented.

These features will now be described in detail. If a basic epoxy resin (composed mainly of an epoxy resin formed by condensation of bisphenol A with epichlorohydrin) is used as the base resin, attainment of an excellent adhesion to a cation electrodeposition coating film customarily used for a car body can be expected. Moreover, by introducing basic nitrogen atoms and primary hydroxyl groups into the resin structure, the following effects can be attained.

(1) Breaking of the film by an alkali generated at the cation electrodeposition can be prevented and the adhesion between the undercoat chromate layer and the cation electrodeposition coating can be stabilized.

(2) By introducing at least two moles of hydroxyl groups per molecule of the epoxy compound, a film having a sufficiently dense crosslinked structure can be obtained (if the amount of the introduced hydroxyl groups is smaller than 2 moles, the crosslinking is insufficient).

The film of the resin composition of the present invention may comprise various additives in addition to the above-mentioned base resin. For example, the following combinations can be mentioned.

(1) Base resin + polyisocyanate compound
(2) Base resin + polyisocyanate compound + silica
(3) Base resin + silica
(4) Base resin + polyisocyanate compound + silica + hardly soluble chromium compound
(5) Base resin + silica + hardly soluble chromium compound (6) Base resin+polyisocyanate compound+silica+-silane compound (7) Base resin+polyisocyanate compound+silica+-silane compound+hardly soluble chromium compound These additives and combinations will now be described in detail.

As curing means for forming the film of the present invention, there is preferably adopted a method in which urethanation reaction between the isocyanate and the hydroxyl group in the base resin is a main reaction. For this reaction, a polyisocyanate compound is incorporated.

In order to stably store the resin composition before formation of the film, it is necessary to protect the isocyanate of the curing agent. As the protecting means, there may be adopted a method in which the polyisocyanate compound is protected so that the protecting group is isolated by heating to regenerate the isocyanate group.

As the polyisocyanate compound, there can be used aliphatic isocyanates, alicyclic isocyanates (inclusive of heterocyclic isocyanates) and aromatic isocyanates having at least two isocyanate groups in one molecule, and compounds obtained by partially reacting these isocyanate compounds with a polyhydric alcohol. For example, there can be mentioned (1) m-phenylene diisocyanate, p-phenylene diisocyanate, 2,4-tolylene diisocyanate, 2,6-tolylene diisocyanate, p-xylene diisocyanate, hexamethylene diisocyanate, dimer acid diisocyanate and isophorone diisocyanate, and (2) reaction products obtained by reacting at least one member selected from the compounds mentioned in (1) above with a polyhydric alcohol (for example, a dihydric alcohol such as ethylene glycol or propylene glycol, a trihydric alcohol such as glycerol or trimethylolpropane, a tetrahydric alcohol such as pentaerythritol or a hexahydric alcohol such as sorbitol or dipentaerythritol), which have at least 2 isocyanate groups left in one molecule.

As the protecting agent (blocking agent) for the polyisocyanate compound, there can be mentioned, for example, (1) aliphatic alcohols such as methanol, ethanol, propanol, butanol and octyl alcohol, (2) monoethers of ethylene glycol and/or diethylene glycol, such as methyl, ethyl, propyl (n- and iso) and butyl (n-, iso- and sec-) monoethers, (3) aromatic alcohols such as phenol and cresol, and oximes such as acetoxime and methylethyl ketone oxime. By reacting the above-mentioned polyisocyanate compound with at least one compound selected from the foregoing compounds, a polyisocyanate compound protected stably at least under normal temperature conditions can be obtained.

It is preferred that the polyisocyanate compound as the curing agent be incorporated in an amount of 5 to 80 parts, especially 10 to 50 parts, per 100 parts by the base resin (as the solid). Since the polyisocyanate compound has a water-absorbing property, if the polyisocyanate compound is incorporated in an amount exceeding 80 parts, the adhesion is degraded. Furthermore, if the surface-treated steel plate for a car body is subjected to the electrodeposition coating or spray coating operation, the unreacted polyisocyanate compound migrates into the coating to inhibit curing of the coating and degrade the adhesion. In view of the foregoing, it is preferred that the polyisocyanate compound be incorporated in an amount of up to 80 parts by weight per 100 parts by weight of the base resin.

An alkyl-etherified amino resin obtained by reacting a methylol compound, formed by reacting at least one member selected from melamine, urea and benzoguanamine with formaldehyde, partially or completely with a monohydric alcohol having 1 to 5 carbon atoms may be used as the crosslinking agent in combination with the polyisocyanate compound.

The resin can be sufficiently crosslinked by the above-mentioned crosslinking agent. In order to further increase the low-temperature crosslinking property, it is preferred that a known curing promoting catalyst be used in combination with the curing agent. As the curing promoting catalyst, there can be mentioned, for example, N-ethylmorpholine, dibutyl tin laurate, cobalt naphthenate, stannous chloride, zinc naphthenate and bismus nitrate. Moreover, a known resin such as an acrylic resin, an alkyd resin or a polyester may be incorporated into the resin composition for improving certain physical properties such as the adhesiveness.

If the polyisocyanate compound is used as the curing agent, a sufficiently dense film having a high crosslinking degree can be obtained by low-temperature curing.

In order to improve the anti-corrosive effect, silica may be incorporated into the film of the resin composition, irrespectively of whether or not the above-mentioned polyisocyanate compound is incorporated. The base resin/silica weight ratio is from 99/1 to 30/70, preferably from 90/10 to 50/50, especially preferably from 80/20 to 60/40. The mechanism of improving the anti-corrosive effect by incorporation of silica has not been completely elucidated, but it is presumed that $Zn^{2+}$ dissolved in a corrosive environment reacts with silica to form a stable corrosion product inhibiting pitting, whereby an improved anti-corrosive effect is attained for a long period.

If the amount incorporated of silica is smaller than the amount corresponding to the base resin/silica weight ratio of 99/1, no substantial corrosion resistance-improving effect is attained by incorporation of silica, and if the amount incorporated of silica is larger than the amount corresponding to the base resin/silica weight ratio of 30/70, the adhesion of the multi-layer coating comprising at least two layers is reduced.

In order to obtain a high anti-corrosive effect, it is preferred that silica be incorporated in an amount exceeding the amount corresponding to the base resin/silica weight ratio of 90/10, especially 80/20.

In the case where a hardly soluble chromium compound described hereinafter is incorporated, if silica is incorporated in too large an amount, the film is rendered porous, resulting in reduction of the adhesion of a multi-layer coating comprising at least two layers. Accordingly, in the case where a hardly soluble chromium compound is incorporated, it is preferred that silica be incorporated in an amount not larger than the amount corresponding to the base resin/silica weight ratio of 50/50, especially 60/40.

As the silica that is used in the present invention, there can be mentioned colloidal silica, water-dispersible silica called "fumed silica" and hydrophobic silica. Attainment of an effect of improving the corrosion resistance is expected even by use of water-dispersible silica, but as described hereinafter, hydrophobic silica improves the corrosion resistance more prominently. It is preferred that the particle size of silica be 1 to 500 m$\mu$, especially 5 to 100 m$\mu$.

Colloidal silica or water-dispersible silica known as fumed silica has the surface covered with a hydroxyl group (silanol group-S-OH), and it shows hydrophilic properties. Since this silanol group is rich in the reactivity, it readily reacts with various organic compounds to render the surface of silica organic.

Hydrophobic silica is formed by substituting the silanol group on the surface of this water-dispersible silica partially or substantially completely with a methyl group or alkyl group to render the surface hydrophobic.

There are various methods for the production of hydrophobic silica. For example, there can be mentioned reactions using an organic solvent such as an alcohol, a ketone or an ester, a silane, a silazane or a polysiloxane. As the reaction method, there can be mentioned a method in which the reaction is carried out in an organic solvent under compression and a method in which heating is effected in the presence of a catalyst.

Silica has an excellent anti-corrosive effect, and hydrophobic silica is especially effective for improving the corrosion resistance. For example, in Japanese Patent Application Laid-Open Specification No. 224174/83 mentioned hereinbefore, it is taught that water-dispersible colloidal silica is added to an organic resin. However, since water-dispersible silica is highly hydrophilic, the compatibility with a solvent is poor, and because of this high hydrophilic characteristic, permeation of water is readily caused, resulting in reduction of the corrosion resistance, and it is presumed that initial rusting is readily caused in a wet environment.

Therefore, in the production of the steel plate of the invention, it is preferred that silica having the surface rendered hydrophobic (hydrophobic silica) be incorporated into the basic epoxy resin to increase the compatibility with the basic epoxy resin and obtain a high corrosion resistance.

As such hydrophobic silica, there can be mentioned (1) colloidal silica dispersed in an organic solvent such as methyl alcohol, ethyl alcohol, n-propyl alcohol, isopropyl alcohol, n-butyl alcohol, ethyl cellosolve or ethylene glycol (for example, OSCAL 1132, 1232, 1332, 1432, 1532, 1622, 1722 or 1724 supplied by Shokubai Kasei Kogyo), and (2) silica having the surface rendered hydrophobic by an organic solvent or a reactive silane compound, that is, hydrophobic ultrafine particulate silica (for example, R974, R811, R812, R805, T805, R202, RY200 or RX200 supplied by Nippon Aerosil).

Hydrophobic silica as described above is stably dispersed in the basic epoxy resin.

In the present invention, a hardly soluble chromium compound can be incorporated in the resin composition film together with the above-mentioned silica, whereby the corrosion resistance can be further improved. In a corrosive environment, a minute amount of $Cr^{6+}$ is dissolved out from the hardly soluble chromium compound and exerts a passivating action over a long period to improve the corrosion resistance.

The hardly soluble chromium compound is incorporated in such an amount that the base resin/hardly soluble chromium compound weight ratio is in the range of from 99/1 to 60/40. If the amount of the hardly soluble chromium compound is smaller than the amount corresponding to the base resin/hardly soluble chromium compound weight ratio of 99/1, improvement of the anti-corrosive effect cannot be expected by the incorporation. If the amount of the hardly soluble chromium compound is larger than the amount corresponding to the base resin/hardly soluble chromium compound weight ratio of 60/40, the adhesion of a multi-layer coating comprising at least two layers and the corrosion resistance are degraded by the water-absorbing action of the hardly soluble chromium compound.

In order to attain a highly improved anti-corrosive effect by incorporation of the hardly soluble chromium compound and assuredly prevent degradation of the adhesion and corrosion resistance of the multi-layer coating by excessive incorporation, it is preferred that the hardly soluble chromium compound be incorporated in such an amount that the base resin/hardly soluble chromium compound weight ratio is in the range of from 97/3 to 65/35, especially from 95/5 to 75/25.

As the chromium compound, there can be mentioned powders of strontium chromate, lead chromate, zinc chromate, barium chromate, calcium chromate and potassium zinc chromate. At least one member selected from these chromium compounds is dispersed in the base resin.

Other chromium compounds are inferior in the compatibility with the base resin, or are poor in the two-coat adhesion because soluble $Cr^{6+}$ is contained in a large amount, though they exhibit a certain anti-corrosive effect. Therefore, other chromium compounds are not suitable for attaining the objects of the present invention.

The resin composition film may further comprise a silane compound, that is, a monomer or oligomer of a di- or tri-alkoxysilane compound, in addition to the above-mentioned polyisocyanate compound and silica, optionally together with the above-mentioned hardly soluble chromium compound.

It is construed that the silane compound acts as a crosslinking agent between the basic epoxy resin and the silica component.

More specifically, if the silane compound is added, the crosslinking density is increased in the resin film and a strong barrier film is formed. Accordingly, the bare corrosion resistance is improved and damage of the film by working is decreased, and it is presumed that for this reason, the corrosion resistance after working is improved.

Moreover, the silane compound enhances the adhesion force in the interface between the chromate film and the resin and the adhesion force in the interface between the silica component and the resin, with the result that permeation of water in a wet environment is prevented and the corrosion resistance after the coating operation is improved.

As the silane compound, there can be mentioned divinyldimethoxysilane, divinyldi-$\beta$-methoxyethoxysilane, di($\gamma$-glycidopropyl)dimethoxysilane, vinyltriethoxysilane, vinyltris-$\beta$-methoxyethoxysilane, $\gamma$-glycidopropyltrimethoxysilane, $\beta$-(3,4-epoxychlorohexyl)ethyltrimethoxysilane, N$\beta$-aminoethyl-$\gamma$-propylmethyldimethoxysilane, N-$\beta$-aminoethyl-$\gamma$-propyltrimethoxysilane, $\gamma$-aminopropyltriethoxysilane, and oligomers thereof.

The silane compound is incorporated in an amount of 0.1 to 15 parts, preferably 0.5 to 10 parts, per 100 parts of the sum of the solids of the basic epoxy resin and silica component. If the amount of the silane compound is smaller than 0.1 part, no substantial effect can be attained by incorporation of the silane compound, and if the amount of the silane compound is larger than 15 parts, increase of the effect corresponding to increase of the amount incorporated cannot be attained but the process becomes disadvantageous from the economical viewpoint.

In addition to the above-mentioned polyisocyanate compound, silica, hardly soluble chromium compound and silane compound, the resin composition may comprise other additives and pigments (chromium type rust-preventive pigments, non-chromium-type rust-preventive pigments, extender pigments, coloring pigments and the like).

The resin composition film is obtained by coating the above-mentioned resin composition in a predetermined thickness by a roll squeezing method, a roll coating method or an air knife coating method, and, if the polyisocyanate compound is contained, heat-baking the coating at a plate temperature of 80° to 250° C., preferably 100° to 200° C. The steel plate of the present invention is characterized in that it can be obtained by such low-temperature baking.

If the baking temperature is lower than 80° C., crosslinking of the film is not advanced and no sufficient corrosion resistance can be obtained. If the baking temperature exceeds 250° C., the corrosion resistance is degraded as in Japanese Patent Application Laid-Open Specification No. 174879/85 mentioned hereinbefore. It is presumed that if the baking temperature exceeds 250° C., by evaporation of water contained in the chromate film and abrupt advance of dehydration condensation of hydroxyl groups

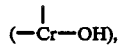

destruction of the chromate film is advanced by formation of cracks in the chromate film and by reduction of $Cr^{6+}$, the passivating action is weakened.

In case of the resin composition film not containing the polyisocyanate compound, after coating, the film is dried with hot air at a plate temperature of normal temperature to 250° C., preferably normal temperature to 170° C., whereby a dry film is obtained within several seconds to several minutes. The method for drying the film is not limited to the hot air drying method.

The above-mentioned resin composition film of the present invention is formed on the chromate film in an amount deposited of 0.1 to 3.5 g/m², preferably 0.3 to 2.0 g/m². deposited of the resin film is smaller than 0.1 g/m², no sufficient corrosion resistance can be obtained, and if the amount deposited of the resin film is larger than 3.5 g/m², the weldabilty (especially, the adaptability to continuous multi-spot welding) is reduced. Accordingly, a deposited amount in the range of 0.1 to 3.5 g/m² is preferred for a highly corrosion-resistant surface-treated steel body for a car body.

Cation electrodeposition is effected on a car body. If the wet electric resistance of the chromate film plus the resin composition film exceeds 200 KΩ/cm², a cation electrodeposition coating is not formed in a good condition. Accordingly, in the steel plate of the present invention, which is used mainly for a car body, it is preferred that the chromate film and resin composition film be formed so that the wet electric resistance of the chromate film plus the resin composition film is controlled below 200 KΩ/cm².

The present invention includes a steel plate having the above-mentioned film structure on one or both of the surfaces. For examples, the steel plate of the present invention includes the following embodiments.

(1)

One surface: deposited metal film/chromate film/resin composition film
Other surface: Fe surface (2)

One surface: deposited metal film/chromate film/resin . composition film
Other surface: deposited metal film (3)

Both surfaces: deposited metal film/chromate film/resin composition film

EXAMPLE 1

Steel plates of the present invention differing in the deposited metal component and the film deposition amount, as shown in Tables 1-a, 1-b and 1-c, were subjected to the adhesion test and corrosion resistance test. Comparative steel plates shown in Tables 2-a and 2-b were similarly tested.

The deposited metal components of the steel plates were as described below. The steel plates having a chromate film and a basic epoxy resin film, shown in the tables, were prepared by alkali-degreasing a metal-deposited steel plate, washing it with water, drying it, coating the metal-deposited steel plate with a coating type chromate treatment liquid by a roll coater or dipping the metal-deposited steel plate in an electrolytic chromate treatment bath to form an electrolytic chromate film, drying the steel plte and coating it with a basic epoxy resin liquid for formation of a second film layer by a roll coater, followed by drying, heat treatment and air cooling.

Ni-Zn Alloy electric deposition: Ni content of 12%
Fe-Zn Alloy electric deposition: Fe content of 25%
Mn-Zn Alloy electric deposition: Mn content of 60%
Zn-Al Alloy electric deposition: Al content of 5%

The coating type chromate treatment, the electrolytic treatment and the basic epoxy resin liquid will now be described in detail.

Coating type chromate treatment conditions

A chromate treatment liquid having a $Cr^{3+}/Cr^{6+}$ ratio of ⅔, a pH value of 2.5 (adjusted by KOH) and a solid content of 20 g/l was coated at normal temperature by a roll coater, followed by drying.

Electrolytic chromate treatment conditions

A cathode electrolytic treatment was carried out density of 4.9 A/dm² for 2.0 seconds in a bath having a $CrO_3$ concentration of 50 g/l and an $H_2SO_4$ concentration of 0.5 g/l, which was maintained at 50° C., and the treated steel plate was washed with water and dried.

Resin composition

A base resin prepared according to procedures described below was mixed with a curing agent at a ratio shown in Table 3 to form a resin composition.

Base resin.

(I) A reaction vessel equipped with a reflux cooler, a stirrer, a thermometer and a nitrogen-blowing device was charged with 1600 g of Epikote 1004 (epoxy resin supplied by Shell Chemical, molecular weight=about 1600), 57 g of pelargonic acid and 80 g of xylene, and reaction was carried out at 170° C. until the acid value of the reaction product was reduced to 0. Xylene was removed under reduced pressure to obtain a reaction intermediate [A].

(II) A reaction vessel equipped with a stirrer, a reflux cooler, a thermometer and a liquid dropping funnel was charged with 1880 g (0.5 mole) of Epikote 1009 (epoxy resin supplied by Shell Chemical, molecular weight=3750) and 1000 g of a methylisobutylketone/xylene mixed solvent (1/1 weight ratio), and the content was heated with stirring and the resin was homogeneously dissolved at the boiling point of the solvent. Then, the solution was cooled to 70° C. and 70 g of di(n-propanol)amine contained in the liquid dropping funnel was dropped to the solution in the reaction vessel over a period of 30 minutes. During this period, the reaction temperature was maintained at 70° C. After the dropwise addition, the reaction mixture was maintained at 120° C. for 2 hours to complete the reaction and obtain a resin A. The content of the effective component in the resin A was 66%.

(III) The same reaction vessel as used in (II) above was charged with 1650 g of the reaction intermediate [A]obtained in (I) above and 1000 g of xylene, and the content was heated at 100° C. and 65 g of diethanolamine and 30 g of monoethanolamine contained in the liquid dropping funnel were dropped into the reaction vessel over a period of 30 minutes. Then, the reaction mixture was maintained at 120° C. for 2 hours to complete the reaction and obtain a resin B. The content of the effective component in the resin B was 63%.

Curing agent (I) A reaction vessel equipped with a thermometer, a stirrer and a reflux cooler was charged with 250 parts of 4,4-diphenylmethane diisocyanate and 50 parts of diisobutylketone, and they were homogeneously mixed together. Then, 184 parts of ethylene glycol monoethyl ether was added to the mixture, and reaction was carried out for 2 hours at 90° C. and for 3 hours at 110° C. to obtain a completely urethanated curing agent a. The content of the effective component in the curing agent a was 89%.

(II) A reaction vessel equipped with a thermometer, a stirrer and a reflux cooler provided with a dropping funnel was charged with 222 parts of isophorone diisocyanate, and 100 parts of methylisobutylketone was added to form a homogeneous solution. Then, 88 parts of a 50% solution of trimethylolpropane in methylisobutylketone was dropped from the dropping funnel to the isocyanate solution being stirred at 70° C. over a period of 1 hour. Then, the reaction mixture was maintained at 70° C. for 1 hour and at 90° C. for 1 hour. Then, 230 parts of n-butyl alcohol was added and reaction was carried out at 90° C. for 3 hours to obtain a blocked isocyanate designated as curing agent b. The content of the effective component in the curing agent b was 76%.

At the adhesion test, a phosphate-treated sample was subjected to electrodeposition coating with a cation electrodeposition paint, U-50 supplied by Nippon Paint, to form a film having a thickness of 20 μ, and Amilac No. 002 supplied by Kansai Paint was spray-coated in a thickness of 30 μ to form a two-coat coating. Separately, S-93 Sealer supplied by Nippon Paint was coated in a thickness of 40 μ on the above-mentioned electrodeposition coating film and Amilac #805 White supplied by Kansai Paint was further coated in a thickness of 40 μ to form a three-coat coating. The primary adhesion and secondary adhesion were tested at the adhesion test. At the primary adhesion test, 100 square cuts were formed at intervals of 1 mm on the coating surface of the sample, and an adhesive tape was applied to the cut surface and was then peeled. At the secondary adhesion test, the coated sample was immersed in warm water (pure water) at 40° C. for 120 hours, and within 30 minutes, cut squares were formed at intervals of 1 mm in the same manner as described above, and an adhesive tape was applied to the cut surface and was then peeled.

The corrosion resistance was evaluated according to a cycle test comprising the following steps as one cycle:

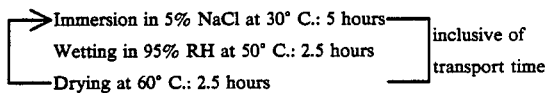

In Tables 1 and 2, the corrosion resistance was evaluated at the predetermined cycle number. Incidentally, a plate sample was tested after cross cuts had been formed in the lower portion.

At the corrosion test for evaluating the corrosion resistance after working, a sample was subjected to the draw-beading test under the following conditions and the corrosion resistance was tested after 75 cycles and 100 cycles.

Bead shape: top end angle of 60°, top end R of 0.5, bead height of 5 mm
Sample size: 25 mm×300 mm
Draw-up speed: 200 mm/min
Pressing force: 500 Kg At the test for evaluation of the corrosion resistance after coating, cross cuts were formed after the electrodeposition coating and the test was conducted for 100 cycles, and the maximum blister width was measured and the corrosion resistance after coating was expressed by ½ of the measured maximum blister width value.

Standards for evaluation of the test results are as follows.

(1) Corrosion resistance of uncoated plate and corrosion resistance after working
 ⊚ : no red rusting
 ○ + : red rusting-occurring area ratio smaller than 5%
 ○ : red rusting-occurring area ratio of 5 to 10%
 ○ − : red rusting-occurring area ratio of 10 to 20%
 Δ : red rusting-occurring area ratio of 20 to 50%
 X : red rusting-occurring area ratio larger than 50%

(2) Corrosion resistance after coating
 ⊚ : blister width smaller than 0.5 mm
 ○ + : blister width of 0.5 to 1.0 mm
 ○ : blister width of 1.0 to 2.0 mm
 ○ − : blister width of 2.0 to 3.0 mm
 Δ : blister width of 3.0 to 5.0 mm
 X : blister width larger than 5.0 mm (3) Two-coat or three-coat adhesion
 ⊚ : peeled area ratio of 0%
 ○ + : peeled area ratio smaller than 5%
 ○ : peeled area ratio of 5 to 10%
 ○ − : peeled area ratio of 10 to 20%
 Δ : peeled area ratio of 20 to 50%
 X : peeled area ratio larger than 50%

TABLE 1-a

| | A | | D | | G | H-I | | | | F | | | | | | |
| | | | | | | B | I | | | L | M | N | | | | |
| | | | | | | | | | | 100 | 75 | 100 | O | | R | |
| No. | B | C | B | E | (*2) | (*3) | (*1) | J | K | cycle | cycle | cycle | P | Q | P | Q |
|---|---|---|---|---|---|---|---|---|---|---|---|---|---|---|---|---|
| Samples of the invention | | | | | | | | | | | | | | | | |
| 1 | Ni—Zn plating | 20 | Coating type | 50 | 1 | — | — | 1.2 | 80 | ◉ | ○− | ○− | ◔+ | ◉+ | ○ | ○ |
| 2 | Ni—Zn plating | " | " | " | " | — | — | " | 100 | ◉ | ○ | ○ | ◉ | ◉ | ◉ | ◉ |
| 3 | Ni—Zn plating | " | " | " | " | — | — | " | 150 | ◉ | ○ | ○ | ◉ | ◉ | ◉ | ◉ |
| 4 | Ni—Zn plating | " | " | " | " | — | — | " | 200 | ◉ | ○ | ○ | ◉ | ◉ | ◉ | ◉ |
| 5 | Ni—Zn plating | " | " | " | " | — | — | " | 250 | ◉ | ○− | ○ − | ◉ | ◉ | ◉ | ◉ |
| 6 | Ni—Zn plating | " | " | " | " | — | — | 0.1 | 150 | ◉ | ○− | ○ − | ◉ | ◉ | ◉ | ◉ |
| 7 | Ni—Zn plating | " | " | " | " | — | — | 0.3 | " | ◉ | ○ | ○ | ◉ | ◉ | ◉ | ◉ |
| 8 | Ni—Zn plating | " | " | " | " | — | — | 2.0 | " | ◉ | ○ | ○ | ◉ | ◉ | ◉ | ◉ |
| 9 | Ni—Zn plating | " | " | " | " | 1 | 5 | 1.2 | " | ◉ | ○+ | ○+ | ◉ | ◉ | ◉ | ◉ |
| 10 | Ni—Zn plating | " | " | " | " | " | 20 | " | " | ◉ | ○ | ◉ | ◉ | ◉ | ◉ | ◉ |
| 11 | Ni—Zn plating | " | " | " | " | " | 30 | " | " | ◉ | ○ | ◉ | ◉ | ◉ | ◉ | ◉ |
| 12 | Ni—Zn plating | " | " | " | " | " | 50 | " | " | ◉ | ○ | ◉ | ◉ | ◉ | ○ | ◉ |
| 13 | Ni—Zn plating | " | " | " | " | " | 70 | " | " | ◉ | ○+ | ◉ | ○ + | ○+ | ○ | ○ |
| 14 | Ni—Zn plating | " | " | " | " | 2 | 5 | " | " | ◉ | ○+ | ○+ | ◉ | ◉ | ◉ | ◉ |
| 15 | Ni—Zn plating | " | " | " | " | " | 20 | " | " | ◉ | ○ | ◉ | ◉ | ◉ | ◉ | ◉ |
| 16 | Ni—Zn plating | " | " | " | " | " | 30 | " | " | ◉ | ○ | ◉ | ◉ | ◉ | ◉ | ◉ |
| 17 | Ni—Zn plating | " | " | " | " | " | 50 | " | " | ◉ | ○ | ◉ | ◉ | ◉ | ○ | ◉ |
| 18 | Ni—Zn plating | " | " | " | " | " | 70 | " | " | ◉ | ○+ | ◉ | ○ + | ○+ | ○ | ◉ |
| 19 | Ni—Zn plating | " | " | " | " | 3 | 30 | " | " | ◉ | ○ | ○ | ◉ | ◉ | ◉ | ◉ |
| 20 | Ni—Zn plating | " | " | " | " | 4 | " | " | " | ◉ | ○ | ○ | ◉ | ◉ | ◉ | ◉ |
| 21 | Ni—Zn plating | " | " | " | " | 5 | " | " | " | ◉ | ○ | ◉ | ◉ | ◉ | ◉ | ◉ |
| 22 | Ni—Zn plating | " | " | " | " | 2 | " | " | 80 | ◉ | ○ | ○ | ◉ | ◉+ | ○+ | ○ |
| 23 | Ni—Zn plating | " | " | " | " | " | " | " | 100 | ◉ | ○ | ◉ | ◉ | ◉ | ◉ | ◉ |
| 24 | Ni—Zn plating | " | " | " | " | " | " | " | 200 | ◉ | ○ | ◉ | ◉ | ◉ | ◉ | ◉ |
| 25 | Ni—Zn plating | " | " | " | " | " | " | " | 250 | ◉ | ○+ | ○ + | ◉ | ◉ | ◉ | ◉ |
| 26 | Ni—Zn plating | " | " | " | " | " | " | 0.1 | 150 | ◉ | ○ | ○ | ◉ | ◉ | ◉ | ◉ |
| 27 | Ni—Zn plating | " | " | " | " | " | " | 0.3 | " | ◉ | ○ | ◉ | ◉ | ◉ | ◉ | ◉ |
| 28 | Ni—Zn plating | " | " | " | " | " | " | 2.0 | " | ◉ | ○ | ◉ | ◉ | ◉ | ◉ | ◉ |
| 29 | Ni—Zn plating | " | " | " | " | 2 | — | — | 1.2 | " | ◉ | ○ | ○ + | ◉ | ◉ | ◉ | ◉ |
| 30 | Ni—Zn plating | " | " | " | " | 3 | — | — | " | " | ◉ | ○ | ○ | ◉ | ◉ | ◉ | ◉ |
| 31 | Ni—Zn plating | " | " | " | " | 4 | — | — | " | " | ◉ | ○ | ○ | ◉ | ◉ | ◉ | ◉ |
| 32 | Ni—Zn plating | " | " | 200 | 1 | — | — | " | " | ◉ | ○+ | ○ + | ◉ | ◉ | ◉ | ◉ |

TABLE 1 - a-continued

| | A | | D | | G | H-I | | F | | | | O | | R | |
|No.|B|C|B|E|(*2)|B (*3)|I (*1)|J|K|L 100 cycle|M 75 cycle|N 100 cycle|P|Q|P|Q|
|33|Ni—Zn plating|"|← |50|"|—|—|"|"|◉|○-|○-◉|◉|◉|◉|
|34|Ni—Zn plating|"| |"|"|6|30|"|"|◉|○-|○|○|◉|◉|◉|
|35|Fe—Zn plating|40|"|"|"|—|—|"|"|◉|○-|○-○-|◉|◉|◉|
|36|Zn—Mn plating|20|"|"|"|—|—|"|"|◉|○+|○+◉|◉|◉|◉|

→ Electrolytic type
← Coating type

Note:
A: Starting plate
B: Kinds
C: Deposited amount [g/m²]
D: Chromate film
E: Amount of deposited chromate [mg/m²]
F: Resin film
G: Cationic base resin (*2)
H: Additive I
I: Amount [parts]
J: Amount of deposited film [g/m²]
K: Baking plate temperature [C.°]
L: Corrosion resistance of uncoated plate (100 cycles)
M: Corrosion resistance after working (75 cycles)
N: Corrosion resistance after coating (100 cycles)
O: 2-coate adhesion
P: Primary adhesion
Q: Secondary adhesion
R: 3-coat adhesion TABLE 1 - b

| | A | | D | | G | H-I | | H-II | | J | K |
|No.|B|C|B|E|(*2)|B (*3)|I (*1)|B (*5)|I (*4)| |°C.|
| Samples of the invention | | | | | | | | | | | |
|37|Ni—Zn plating|20|Coating type|50|8|—|—|—|—|1.2|150|
|38|Ni—Zn plating|"|"|"|9|—|—|—|—|"|150|
|39|Ni—Zn plating|"|"|5|1|—|—|—|—|"|150|
|40|Ni—Zn plating|"|"|10|"|—|—|—|—|"|150|
|41|Ni—Zn plating|"|"|5|"|2|30|—|—|"|150|
|42|Ni—Zn plating|"|"|10|"|"|"|—|—|"|150|
|43|Ni—Zn plating|"|"|200|"|"|"|—|—|"|150|
|44|Ni—Zn plating|"|"|50|11|—|—|—|—|"|150|
|45|Ni—Zn plating|"|"|"|"|2|30|—|—|"|150|
|46|Ni—Zn plating|"|"|"|5|—|—|—|—|"|150|
|47|Ni—Zn plating|"|"|"|1|—|—|—|—|3.5|150|
|48|Ni—Zn plating|"|"|"|"|2|30|—|—|"|150|
|49|Ni—Zn plating|"|"|200|"|—|—|—|—|1.2|150|
|50|Ni—Zn plating|"|"|1000|"|—|—|—|—|"|150|
|51|Ni—Zn plating|"|"|"|"|2|30|—|—|"|150|

| No. | L 100 cycles | M 75 cycles | M-1 100 cycles | N 100 cycles | O | | R | | S |
|---|---|---|---|---|---|---|---|---|---|
| | | | | | P | Q | P | Q | |
| Samples of the invention | | | | | | | | | |
| 37 | ○ | ○ | ○— | ○ | ○+ | ○+ | ○ | ○ | ○ |
| 38 | ○ | ○— | ○— | ○— | ○+ | ○+ | ○ | ○ | ○ |

TABLE 1 - b-continued

| | | | | | | | | | |
|---|---|---|---|---|---|---|---|---|---|
| 39 | ◉ | ○− | — | ○− | ◉ | ◉ | ◉ | ◉ | |
| 40 | ◉ | ○ | — | ○ | ◉ | ◉ | ◉ | ◉ | |
| 41 | ◉ | ○+ | — | ○+ | ◉ | ◉ | ◉ | ◉ | |
| 42 | ◉ | ◉ | — | ● | ◉ | ◉ | ◉ | ◉ | |
| 43 | ◉ | ◉ | — | ● | ◉ | ◉ | ◉ | ◉ | |
| 44 | ○+ | ○− | — | ○− | ○+ | ◉+ | ○ | ○/○ | |
| 45 | ◉ | ○ | — | ○ | ○+ | ◉+ | ○ | ○ | |
| 46 | ◉ | ○ | — | ○ | ◉ | ◉ | ◉ | ◉ | |
| 47 | ◉ | ○+ | — | ○+ | ◉ | ◉ | ◉ | ◉ | U |
| 48 | ◉ | ◉ | — | ●· | ◉ | ◉ | ◉ | ◉ | " |
| 49 | ◉ | ○ | — | ○ | ◉ | ◉ | ◉ | ◉ | |
| 50 | ◉ | ○ | — | ○ | ◉ | ◉ | ◉ | ◉ | U |
| 51 | ● | ○ | — | ○ | ◉ | ◉ | ◉ | ◉ | " |

Note:
A through R: Same
H-II: Additive II
M-1: Corrosion resistance after working (100 cycles)
S: Remarks
U: Spot weldability is slightly poor

TABLE 1 - c

| | A | | D | | | B | H-I I | H-II B | I | | |
|---|---|---|---|---|---|---|---|---|---|---|---|
| No. | B | C | B | E | G | (*3) | (*1) | (*5) | (*4) | J | K |
| Samples of the invention | | | | | | | | | | | |
| 52 | Ni—Zn | 20 | Coating type | 50 | 1 | 1 | 2 | 1 | 2 | 1.2 | 150 |
| 53 | " | " | " | " | " | " | 10 | " | 20 | " | " |
| 54 | " | " | " | " | " | " | 50 | " | 30 | " | " |
| 55 | " | " | " | " | " | " | 70 | " | 40 | " | " |
| 56 | " | " | " | " | " | " | 2 | 2 | 2 | " | " |
| 57 | " | " | " | " | " | " | 10 | " | 20 | " | " |
| 58 | " | " | " | " | " | " | 50 | " | 30 | " | " |
| 59 | " | " | " | " | " | " | 70 | " | 40 | " | " |
| 60 | " | " | " | " | " | " | 10 | 3 | 20 | " | " |
| 61 | " | " | " | " | " | " | " | 4 | " | " | " |
| 62 | " | " | " | " | " | " | " | 5 | " | " | " |
| 63 | " | " | " | " | " | " | " | 6 | " | " | " |
| 64 | " | " | " | " | " | 3 | " | 1 | " | " | " |
| 65 | " | " | " | " | " | 6 | " | 1 | " | " | " |
| 66 | " | " | " | " | " | 1 | 2 | — | — | " | " |
| 67 | " | " | " | " | " | " | 10 | — | — | " | " |
| 68 | Ni—Zn plating | " | " | " | " | " | 50 | — | — | " | " |
| 69 | Ni—Zn plating | " | " | " | " | " | 70 | — | — | " | " |
| 70 | Ni—Zn plating | " | " | " | " | 3 | 10 | — | — | " | " |
| 71 | Ni—Zn plating | " | " | " | " | 6 | " | — | — | " | " |

| No. | L 100 cycles | M 75 cycles | M 100 cycles | N 100 cycles | O P | Q | R P | Q | S |
|---|---|---|---|---|---|---|---|---|---|
| Samples of the invention | | | | | | | | | |
| 52 | ◉ | ○+ | ◉ | ◉ | ◉ | ◉ | ◉ | ◉ | |
| 53 | ◉ | ◉ | ◉ | ◉ | ◉ | ◉ | ◉ | ◉ | |
| 54 | ◉ | ◉ | ◉ | ◉ | ◉ | ● | ◉ | ◉ | |
| 55 | ◉ | ◉ | ◉+ | ◉ | ○+ | ○+ | ○ | ○ | |
| 56 | ◉ | ○+ | ◉ | ◉ | ◉ | ◉ | ◉ | ◉ | |
| 57 | ◉ | ◉ | ◉ | ◉ | ◉ | ◉ | ◉ | ● | |
| 58 | ◉ | ◉ | ◉ | ◉ | ◉ | ◉ | ◉ | ◉ | |
| 59 | ◉ | ◉ | ◉ | ◉ | ○+ | ○+ | ○ | ○ | |
| 60 | ◉ | ◉ | ◉ | ◉ | ◉ | ◉ | ◉ | ◉ | |
| 61 | ◉ | ◉ | ◉ | ◉ | ◉ | ◉ | ◉ | ◉ | |
| 62 | ◉ | ◉ | ◉ | ◉ | ◉ | ◉ | ◉ | ◉ | |
| 63 | ◉ | ◉ | ◉ | ◉ | ◉ | ◉ | ◉ | ◉ | |
| 64 | ◉ | ◉ | ◉ | ◉ | ◉ | ◉ | ◉ | ◉ | |
| 65 | ◉ | ◉+ | ◉− | ○ | ◉ | ◉ | ◉ | ◉ | |
| 66 | ◉ | ◉ | △ | ○+ | ◉ | ◉ | ◉ | ◉ | |
| 67 | ◉ | ◉ | ○− | ◉ | ◉ | ◉ | ◉ | ◉ | |
| 68 | ◉ | ○ | ○− | ◉ | ◉ | ◉ | ◉ | ◉ | |
| 69 | ◉ | ○+ | △ | ◉ | ○+ | ○+ | ○ | ○ | |
| 70 | ◉ | ◉ | ○− | ◉ | ◉ | ◉ | ◉ | ◉ | |

TABLE 1 - c-continued

| | | | | | | | | | |
|---|---|---|---|---|---|---|---|---|---|
| 71 | ⊚ | ○− | △ | ○− | ⊚ | ⊚ | ⊚ | ⊚ | |

Note:
A through S: Same as above

TABLE 2 - a

| | A | | D | | B-1 | F H-I | | | | L 100 | M 75 | N 100 | O | | R | | |
|---|---|---|---|---|---|---|---|---|---|---|---|---|---|---|---|---|---|
| No. | B | C | B | E | (*2) | B (*3) | I (*1) | J | K | cycles | cycles | cycles | P | Q | P | Q | S |
| Comparative | Ni—Zn plating | 20 | Coating type | 50 | 1 | — | — | 1.2 | Air dry | ○ | △ | △ | ○ | ○ | × | × | — |
| 2 | Ni—Zn plating | " | Coating type | " | " | — | — | " | 300 | ○ | △ | △ | ⊚ | ⊚ | × | × | — |
| 3 | Ni—Zn plating | " | Coating type | " | — | — | — | — | 150 | × | × | × | — | — | — | — | — |
| 4 | Ni—Zn plating | " | Coating type | " | 1 | — | — | 5.0 | " | ⊚ | ⊚ | ⊚ | ⊚ | ⊚ | ⊚ | | V |
| 5 | Ni—Zn plating | " | Coating type | " | " | 1 | 80 | 1.2 | " | ⊚ | ○ | ⊚ | × | × | × | × | — |
| 6 | Ni—Zn plating | " | Coating type | " | " | " | 30 | " | Air dry | ○+ | △ | △ | △ | △ | × | × | — |
| 7 | Ni—Zn plating | " | Coating type | " | " | " | " | " | 300 | ○ | △ | △ | ○ | ○ | × | × | — |
| 8 | Ni—Zn plating | " | Coating type | " | ". | " | " | 5.0 | 150 | ⊚ | ⊚ | ⊚ | ○ | ○ | ⊚ | | 'V |
| 9 | Ni—Zn plating | " | Coating type | " | 10 | — | — | 2.3 | " | ⊚ | △ | △ | × | × | × | × | — |
| 10 | Ni—Zn plating | " | Coating type | " | " | — | — | " | 260 | ○ | △ | △ | ○+ | ○+ | △ | × | — |
| 11 | Fe—Zn plating | 40 | Coating type | " | " | — | — | " | " | ○− | △ | △ | ○+ | ○+ | △ | × | — |
| 12 | Zn—Mn | 20 | Coating type | " | " | — | — | " | " | ○+ | △ | △ | ○ | ○ | △ | × | — |
| 13 | | | Zinchro-metal | | | | | | | × | × | △ | ⊚ | ⊚ | ⊚ | ⊚ | — |
| 14 | Ni—Zn | 20 | Coating type | 1500 | 1 | — | — | 1.2 | 150 | ⊚ | △ | ⊚ | ⊚ | ⊚ | ⊚ | ⊚ | V+W |

Note:
A through U: Same as above
V: Spot weldability is poor
W: Peeling of film at press working
B-1: Resin kind

TABLE 2 - b

| | A | | D | | B-1 | F H-I | | H-II | | | |
|---|---|---|---|---|---|---|---|---|---|---|---|
| No. | B | C | B | E | (*2) | B (*3) | I (*1) | B (*5) | I (*4) | J | K |
| Comparative samples | | | | | | | | | | | |
| 15 | Ni—Zn plating | 20 | Coating type | 50 | 6 | — | — | — | — | 1.2 | 150 |
| 16 | Ni—Zn plating | " | " | " | 7 | — | — | — | — | " | " |
| 17 | Ni—Zn plating | " | " | 1500 | 1 | 2 | 30 | — | — | " | " |
| 18 | Ni—Zn plating | " | — | — | " | 2 | 30 | — | — | " | " |
| 19 | Ni—Zn plating | " | " | 50 | " | 1 | 70 | 1 | 50 | " | " |
| 20 | Ni—Zn plating | " | " | " | " | " | 80 | " | 70 | " | " |
| 21 | Ni—Zn plating | " | " | " | " | " | 70 | 2 | 50 | " | " |
| 22 | Ni—Zn | " | " | " | " | " | " | 10 | 7 | 20 | " | " |

| No. | L 100 cycles | M 75 cycles | M 100 cycles | N 100 cycles | O P | Q | R P | Q | S |
|---|---|---|---|---|---|---|---|---|---|
| Comparative samples | | | | | | | | | |
| 15 | ⊚ | △ | — | △ | ○− | ○− | × | × | |
| 16 | ○ | × | — | × | ⊚ | ⊚ | × | × | |
| 17 | ⊚ | △ | — | ⊚ | ⊚ | ⊚ | ⊚ | ⊚ | X V |
| 18 | △ | × | — | × | — | — | — | — | |
| 19 | ⊚ | △ | × | ⊚ | ⊚ | ○ | ⊚ | ○− | |

TABLE 2 - b-continued

| | | | | | | | | |
|---|---|---|---|---|---|---|---|---|
| 20 | ⊕ | × | × | ⊕ | ○+ | ○− | △ | △ |
| 21 | ⊕ | △ | × | ⊕ | ⊚ | ○ | | ○− |
| 22 | ⊚ | ⊚ | ⊕ | ○ | △ | △ | × | × |

Note:
A through X: Same as above

Note
(*1) The amount (parts) of the solid per 100 parts by weight of the sum of the solids of the cationic base resin and additive I.
(*2) See Table 3.
(*3) See Table 4.
(*4) The amount (parts) of the solid per 100 parts of the sum of the solids of the cationic base resin and additive II.
(*5) See Table 5.

TABLE 3

| No. | Base resin | Curing agent | Catalyst |
|---|---|---|---|
| 1 | A 100 parts | a 25 parts | Bibutyl tin dilaurate 1.5 parts |
| 2 | " | " | — |
| 3 | " | b 10 parts | Bisbos nitrate 1.0 parts |
| 4 | B 100 parts | b 20 parts | N—ethylmorpholibe 2.0 parts |
| 5 | A 100 parts | a 50 parts | Bibutyl tin dilaurate 2.0 parts |
| 6 | " | 100 parts | Bibutyl tin dilaurate 4.0 parts |
| 7 | " | — | — |
| 8 | " | a 5 parts | Bibutyl tin dilaurate 0.2 parts |
| 9 | " | a 80 parts | Bibutyl tin dilaurate 3.2 parts |
| 10 | | | Organic composite silicate (silica sol content = 40%, acryl silicate/epoxy silicate ratio = 30/70) according to Japanese Patent Application Laid-Open Specification No. 174879/85 |
| 11 | | | Product obtained by adding 30 g/l of acetic acid to base resin A described in "Base resin (II)" to render the resin water-soluble |

TABLE 4

| No. | |
|---|---|
| 1 | Colloidal silica dispersed in organic solvent (OSCAL 1432 supplied by Shokubai Kasei Kogyo Sha) |
| 2 | Colloidal silica dispersed in organic solvent (OSCAL 1622 supplied by Shokubai Kasei Kogyo Sha) |
| 3 | Hydrophobic ultra-fine particulate silica (R 811 supplied by Nihon Aerozil Sha) |
| 4 | Hydrophobic ultra-fine particulate silica (R 805 supplied by Nihon Aerozil Sha) |
| 5 | 100 parts (*1) of No. 1 + 100 parts of strontium chromate (STRO supplied by Mizusawa Kagaku Kogyo Sha) |
| 6 | Water-dispersible silica (fumed silica) (R 200 supplied by Nihon Aerozil Sha) |

Note:
(*1): Mixing solid ratio

TABLE 5

| No. | Chromium compound |
|---|---|
| 1 | Strontium chromate (supplied by Kikuchi Shikiso Kogyo) |
| 2 | Lead chromate (supplied by Kikuchi Shikiso Kogyo) |
| 3 | Zinc chromate (supplied by Kikuchi Shikiso Kogyo) |
| 4 | Barium chromate (supplied by Kikuchi Shikiso Kogyo) |
| 5 | Calcium chromate (supplied by Kikuchi Shikiso Kogyo) |
| 6 | Potassium zinc chromate (supplied by Kikuchi Shikiso Kogyo) |
| 7 | Potassium chromate (supplied by Kikuchi Shikiso Kogyo) |

EXAMPLE 2

Steel plates of the present invention for the inner face of a car body, which were different in the deposited metal component and the amount deposited of the film as shown in Tables 6 and 7, were subjected to the adhesion test and corrosion test. Comparative steel plates shown in Table 7 were similarly tested.

The deposited metal component was the same as described in Example 1. The steel plates having a chromate film and a basic epoxy resin film, shown in the tables, were prepared by alkali-degreasing a metal-deposited steel plate, washing it with water, drying it, coating the steel plate with a coating type chromate treatment liquid by a roll coater or dipping the steel plate in an electrolytic chromate treatment bath, drying the chromate-treated steel plate and coating the steel plate with a basic epoxy resin liquid for a second layer by a roll coater, followed by drying, heat treatment and air cooling.

The coating type chromate treatment, the electrolytic chromate treatment and the basic epoxy resin liquid will now be described in detail.

Coating type chromate treatment conditions

The treatment conditions were the same as those described in Example 1.

Electrolytic chromate treatment conditions

The treatment conditions were the same as those described in Example 1.

Resin composition

The base resin and curing agent described below were mixed at a ratio shown in Table 8 to form a resin composition.

Base resin

The base resin used was the same as the base resin used in Example 1.

Curing agent

The curing agent used was the same as the curing agent used in Example 1.

At the adhesion test, a phosphate-treated sample was electrodeposition-coated with a cation electrodeposition paint No. 9210 supplied by Kansai Paint to form an electrodeposition coating film having a thickness of 20 $\mu$, and Amilac No. 002 supplied by Kansai Paint was spray-coated in a thickness of 35 $\mu$ on the electrodeposition coating film to form a two-coat coating. A three-coat coating was prepared by coating KPX-27 Sealer supplied by Kansai Paint in a thickness of 40 $\mu$ on the above-mentioned electrodeposition coating film and coating Amilac #805 White suppleed by Kansai Paint in a thickness of 40 $\mu$ thereon. At the adhesion test, the primary adhesion and secondary adhesion were tested in the same manner as described in Example 1.

The corrosion resistance was tested according to the same cycle test method as described in Example 1, and the corrosion resistance was evaluated after predetermined cycles.

At the corrosion test for evaluating the corrosion resistance after working, a sample was subjected to the draw-beading test under the following conditions and the corrosion resistance was tested after 75 cycles.

Bead shape: top end angle of 60°, top end R of 0.25, bead height of 5 mm
Sample size: 25 mm × 300 mm
Draw-up speed: 200 mm/min
Pressing force: 500 Kg The standards for evaluation of the test results were the same as those described in Example 1.

TABLE 6 - a

| No. | A B | C | D B | E | F G (*1) | F Y B (*2) | F Y I (*3) | F Z B (*4) | F Z I (*5) | J | K | M 75 cycles | O P | O P-1 | P | P-1 | S |
|---|---|---|---|---|---|---|---|---|---|---|---|---|---|---|---|---|---|
| Samples of the invention | | | | | | | | | | | | | | | | | |
| 1 | Ni—Zn plating | 20 | Coating type | 50 | 2 | 1 | 80/20 | 1 | 80/20 | 1.1 | 80 | ○+ | ○+ | ○+ | ○ | ○ | |
| 2 | Ni—Zn plating | " | " | " | " | " | " | " | " | " | 100 | ⊚ | ⊚ | ⊚ | ⊚ | ⊚ | |
| 3 | Ni—Zn plating | " | " | " | " | " | " | " | " | " | 150 | ⊚ | ⊚ | ⊚ | ⊚ | ⊚ | |
| 4 | Ni—Zn plating | " | " | " | " | " | " | " | " | " | 200 | ⊚ | ⊚ | ⊚ | ⊚ | ⊚ | |
| 5 | Ni—Zn plating | " | " | " | " | " | " | " | " | " | 250 | ○+ | ⊚ | ⊚ | ⊚ | ⊚ | |
| 6 | Ni—Zn plating | " | " | " | " | " | " | " | " | 0.1 | 150 | ○+ | ⊚ | ⊚ | ⊚ | ⊚ | |
| 7 | Ni—Zn plating | " | " | " | " | " | " | " | " | 0.3 | " | ⊚ | ⊚ | ⊚ | ⊚ | ⊚ | |
| 8 | Ni—Zn plating | " | " | " | " | " | " | " | " | 2.0 | " | ⊚ | ⊚ | ⊚ | ⊚ | ⊚ | |
| 9 | Ni—Zn plating | " | " | " | " | " | " | " | " | 3.5 | " | ⊚ | ⊚ | ⊚ | ⊚ | ⊚ | U |
| 10 | Ni—Zn plating | " | " | " | " | " | " | " | 97/3 | 1.1 | " | ○+ | ⊚ | ⊚ | ⊚ | ⊚ | |
| 11 | Ni—Zn plating | " | " | " | " | " | " | " | 95/5 | " | " | ⊚ | ⊚ | ⊚ | ⊚ | ⊚ | |
| 12 | Ni—Zn plating | " | " | " | " | " | " | " | 75/25 | " | " | ⊚ | ⊚ | ⊚ | ⊚ | ⊚ | |
| 13 | Ni—Zn plating | " | " | " | " | " | " | " | 65/35 | " | " | ○+ | ⊚ | ⊚ | ⊚ | ○+ | |
| 14 | Ni—Zn plating | " | " | " | " | " | 90/10 | " | 97/3 | " | " | ○ | ⊚ | ⊚ | ⊚ | ⊚ | |
| 15 | Ni—Zn plating | " | " | " | " | " | " | " | 95/5 | " | " | ⊚ | ⊚ | ⊚ | ⊚ | ⊚ | |
| 16 | Ni—Zn plating | " | " | " | " | " | 60/40 | " | 75/25 | " | " | ⊚ | ⊚ | ⊚ | ⊚ | ⊚ | |
| 17 | Ni—Zn plating | " | " | " | " | " | 50/50 | " | 65/35 | " | " | ○ | ⊚ | ⊚ | ○+ | ○+ | |
| 18 | Ni—Zn plating | " | " | " | " | " | 70/30 | " | 97/3 | " | " | ○ | ⊚ | ⊚ | ⊚ | ⊚ | |
| 19 | Ni—Zn plating | " | " | " | " | " | 90/10 | " | 80/20 | " | " | ○ | ⊚ | ⊚ | ⊚ | ⊚ | |
| 20 | Ni—Zn plating | " | " | " | " | " | 70/30 | 2 | " | " | " | ⊚ | ⊚ | ⊚ | ⊚ | ⊚ | |
| 21 | Ni—Zn plating | " | " | " | " | " | " | 3 | " | " | " | ⊚ | ⊚ | ⊚ | ⊚ | ⊚ | |

Note:
A through U: Same as above
P-1: Adhesion in warm water
Z: Chromium compound of less solubility TABLE 6 - b

| No. | A B | C | D B | E | F G (*1) | F Y B (*2) | F Y I (*3) |
|---|---|---|---|---|---|---|---|
| Examples of the invention | | | | | | | |
| 22 | Ni—Zn plating | 20 | Coating type | 50 | 2 | 1 | 70/30 |
| 23 | " | " | " | " | " | " | " |
| 24 | " | " | " | " | " | " | " |
| 25 | " | " | " | " | " | 2 | " |
| 26 | " | " | " | " | " | 3 | " |
| 27 | " | " | " | " | " | 4 | " |
| 28 | " | " | " | " | " | 5 | " |
| 29 | " | " | " | " | 1 | 1 | " |
| 30 | " | " | " | " | 3 | " | " |

TABLE 6 - b-continued

| | | | | | | | | |
|---|---|---|---|---|---|---|---|---|
| 31 | " | " | " | " | 4 | " | " | |
| 32 | " | " | " | " | 5 | " | " | |
| 33 | " | " | " | " | 8 | " | " | |
| 34 | " | " | " | " | 9 | " | " | |
| 35 | " | " | " | " | 10 | " | " | |
| 36 | " | " | " | 1 | 2 | " | " | |
| 37 | " | " | " | 10 | " | " | " | |
| 38 | " | " | " | 200 | " | " | " | |
| 39 | " | " | " | 1000 | " | " | " | |
| 40 | " | " | — | 200 | " | " | " | |
| | | | ↑ Electrolytic type | | | | | |
| 41 | Fe—Zn plating | 40 | Coating type | 50 | " | " | " | |
| 42 | Zn—Mn plating | 20 | " | " | " | " | " | |
| 43 | Zn plating | 40 | " | " | " | " | " | |

| | F | | | | M | O | | R | | |
|---|---|---|---|---|---|---|---|---|---|---|
| | Z | | | | | | | | | |
| No. | B (*4) | I (*5) | J | K | (75 cycles) | P | P-1 | P | P-1 | S |
| Examples of the invention | | | | | | | | | | |
| 22 | 4 | 80/20 | 1.1 | 150 | ⊚ | ⊚ | ⊚ | ⊚ | ⊚ | |
| 23 | 5 | " | " | " | ⊚ | ⊚ | ⊚ | ⊚ | ⊚ | |
| 24 | 6 | " | " | " | ⊚ | ⊚ | ⊚ | ⊚ | ⊚ | |
| 25 | 1 | " | " | " | ⊚ | ⊚ | ⊚ | ⊚ | ⊚ | |
| 26 | " | " | " | " | ⊚ | ⊚ | ⊚ | ⊚ | ⊚ | |
| 27 | " | " | " | " | ⊚ | ⊚ | ⊚ | ⊚ | ⊚ | |
| 28 | " | " | " | " | ⊚ | ⊚ | ⊚ | ⊚ | ⊚ | |
| 29 | " | " | " | " | ○+ | ○+ | ○+ | ○ | ○ | |
| 30 | " | " | " | " | ⊚ | ⊚ | ⊚ | ⊚ | ⊚ | |
| 31 | " | " | " | " | ⊚ | ⊚ | ⊚ | ⊚ | ⊚ | |
| 32 | " | " | " | " | ○+ | ○+ | ○+ | ○ | ○ | |
| 33 | " | " | " | " | ⊚ | ⊚ | ⊚ | ⊚ | ⊚ | |
| 34 | " | " | " | " | ⊚ | ⊚ | ⊚ | ⊚ | ⊚ | |
| 35 | " | " | " | " | ○ | ○+ | ○+ | ○ | ○ | |
| 36 | " | " | " | " | ○ | ⊚ | ⊚ | | ⊚ | |
| 37 | " | " | " | " | ⊚ | ⊚ | ⊚ | | ⊚ | |
| 38 | " | " | " | " | ⊚ | ⊚ | ⊚ | | ⊚ | |
| 39 | " | " | " | " | ⊚ | ⊚ | ⊚ | ⊚ | ⊚ | |
| 40 | " | " | " | " | ○ | ⊚ | ⊚ | ⊚ | ⊚ | U |
| 41 | " | " | " | " | ○ | ⊚ | ⊚ | ⊚ | ⊚ | |
| 42 | " | " | " | " | ⊚ | ⊚ | ⊚ | ⊚ | ⊚ | |
| 43 | " | " | " | " | ○ | ⊚ | ⊚ | ⊚ | ⊚ | |

Note:
A through Z: Same as above

TABLE 7

| | A | | D | | G | F | | |
|---|---|---|---|---|---|---|---|---|
| | | | | | | | Y | |
| No. | B | C | B | E | (*1) | B (*2) | I (*3) | |
| Comparative samples | | | | | | | | |
| 1 | Ni—Zn plating | 20 | Coating type | 50 | 2 | 1 | 70/30 | |
| 2 | " | " | " | " | " | " | " | |
| 3 | " | " | " | " | " | " | " | |
| 4 | " | " | " | " | " | " | " | |
| 5 | " | " | " | " | " | " | " | |
| 6 | " | " | " | " | 6 | " | " | |
| 7 | " | " | " | " | 7 | " | " | |
| 8 | " | " | " | " | 11 | — | — | |
| 9 | " | " | " | 0 | 2 | 1 | 70/30 | |
| 10 | " | " | " | 1500 | " | " | " | |
| 11 | | | Zinchro-metal | | | | | |
| 12 | Ni—Zn plating | 20 | Coating type | 50 | 2 | 1 | 95/5 | |
| 13 | " | " | " | " | " | " | 25/75 | |
| 14 | " | " | " | " | " | " | 80/20 | |
| 15 | " | " | " | " | " | " | 95/5 | |
| 16 | " | " | " | " | " | " | 80/20 | |
| 17 | " | " | " | " | " | " | 100/0 | |

| | F | | | | M | O | | R | | |
|---|---|---|---|---|---|---|---|---|---|---|
| | Z | | | | | | | | | |
| No. | B (*4) | I (*5) | J | K | 75 cycles | P | P-1 | P | P-1 | S |
| Comparative | | | | | | | | | | |

TABLE 7-continued

| samples | | | | | | | | | | |
|---|---|---|---|---|---|---|---|---|---|---|
| 1 | 1 | 80/20 | 1.1 | | Δ | ○ | ○ | X | X | |
| 2 | " | " | " | 300 | Δ | ⊚ | ⊚ | X | X | |
| 3 | " | " | 0 | 150 | X | — | — | — | — | |
| 4 | " | " | 5.0 | " | ⊚ | ⊚ | ⊚ | ⊚ | ⊚ | V |
| 5 | 7 | " | 1.1 | " | ○+ | ○ | ⊚ | X | X | |
| 6 | 1 | " | " | " | ○ | ○− | ○− | X | X | |
| 7 | " | " | " | " | Δ | ⊚ | ⊚ | X | X | |
| 8 | — | — | 1.2 | 260 | X | ○+ | ○+ | Δ | X | |
| 9 | 1 | 80/20 | " | " | X | — | — | — | — | |
| 10 | " | " | " | " | ⊚ | ⊚ | ⊚ | ⊚ | ⊚ | V, X |
| 11 | | Zinchro-metal | | | X | ⊚ | ⊚ | ⊚ | ⊚ | |
| 12 | 1 | 99/1 | 1.1 | 150 | Δ | ⊚ | ⊚ | ⊚ | ⊚ | |
| 13 | " | 55/45 | " | " | Δ | Δ | X | X | X | |
| 14 | " | 99/1 | " | " | Δ | ⊚ | ⊚ | ⊚ | ⊚ | |
| 15 | " | 75/25 | " | " | Δ | ⊚ | ⊚ | ⊚ | ⊚ | |
| 16 | " | 100/0 | " | " | Δ | ⊚ | ⊚ | ⊚ | ⊚ | |
| 17 | " | 75/25 | " | " | Δ | ⊚ | ⊚ | ⊚ | ⊚ | |

Note:
A through Z: Same as above
(*1) See Table 8.
(*2) See Table 9.
(*3) Weight ratio of base resin/silica
(*4) See Table 10
(*5) Weight ratio of base resin/chromium compound with less solubility

TABLE 8

| No. | Base resin | Curing agent | Catalyst |
|---|---|---|---|
| 1 | A 100 parts | a 25 parts | Bibutyl tin dilaurate 0.2 parts |
| 2 | A 100 parts | a 25 parts | Bibutyl tin dilaurate 1.0 part |
| 3 | A 100 parts | a 25 parts | — |
| 4 | A 100 parts | a 50 parts | Bibutyl tin dilaurate 2.0 parts |
| 5 | A 100 parts | a 80 parts | Bibutyl tin dilaurate 3.2 parts |
| 6 | A 100 parts | a 100 parts | Bibutyl tin dilaurate 4.0 parts |
| 7 | A 100 parts | — | — |
| 8 | A 100 parts | b 10 parts | Bismuth nitrate 1.0 part |
| 9 | A 100 parts | b 20 parts | N—ethyl formalin 2.0 parts |
| 10 | Product obtained by adding 30 g/l of acetic acid to base resin A obtained in "Base Resin (II)" in Example 1 to render it water-soluble | | |
| 11 | Organic composite silicate (silica sol content = 40%, acrylic silicate/epoxy silicate ratio = 30/70) prepared according to Japanese Patent Application Laid-Open Specification No. 174879/85 | | |

TABLE 9

| | |
|---|---|
| 1 | Hydrophobic ultra-fine particulate silica (supplied by Nihon Aerozil Sha R 811) |
| 2 | Hydrophobic ultra-fine particulate silica (supplied by Nihon Aerozil R 805) |
| 3 | Colloidal silica dispersed in organic solvent (OSCAL 1432 supplied by Shokubai Kasei Kogyo Sha) |
| 4 | Colloidal silica dispersed in organic solvent (OSCAL 1622 supplied by Shokubai Kasei Kogyo Sha) |
| 5 | Hydrophilic silica (fumed silica) (R 200 supplied by Nihon Aerozil Sha R 200) |

TABLE 10

| No. | Additive |
|---|---|
| 1 | Strontium chromate (supplied by Kikuchi Shikiso Kogyo Sha) |
| 2 | Lead chromate (supplied by Kikuchi Shikiso Kogyo Sha) |
| 3 | Zinc chromate (supplied by Kikuchi Shikiso Kogyo Sha) |
| 4 | Barium chromate (supplied by Kikuchi Shikiso Kogyo Sha) |
| 5 | Calcium chromate (supplied by Kikuchi Shikiso Kogyo Sha) |
| 6 | Potassium zinc chromate (supplied by Kikuchi Shikiso Kogyo Sha) |
| 7 | Potassium chromate (supplied by Nihon Kagaku Kogyo Sha) |

EXAMPLE 3

The steel plates of the present invention for the inner face of a car body, which differed in the deposited metal component and the amount deposited of the film as shown in Tables 11-a and 11-b, were subjected to the adhesion test and corrosion resistance test. Furthermore, comparative steel plates shown in Table 12 were similarly tested.

The deposited metal component was the same as described in Example 1. The steel plates having a chromate film and a basic epoxy resin film, shown in the tables, were prepared by alkali-degreasing a metal-deposited steel plate, washing it with water, drying it, coating the steel plate with a coating type chromate treating liquid by a roll coater or dipping the steel plate in an electrolytic chromate treatment liquid to form an electrolytic chromate film, drying the treated steel plate and coating a basic epoxy resin liquid for a second layer on the treated steel plate by a roll coater, followed by drying, heat treatment and air cooling.

The coating type chromate treatment, the electrolytic chromate treatment and the basic epoxy resin liquid will now be described in detail.

Coating type chromate treatment conditions

The coating type chromate treatment conditions were the same as those described in Example 1.

Electrolytic chromate treatment conditions

The electrolytic chromate treatment conditions were the same as those described in Example 1.

Resin composition

The base resin and curing agent described below were mixed at a ratio shown in Table 13 to form a resin composition.

Base resin

The same base resin as used in Example 1 was used.

Curing agent

The same curing agent as used in Example 1 was used.

The adhesion test was carried out under the same conditions as described in Example 2.

The corrosion resistance was evaluated according to a cycle test comprising the following steps as one cycle:

```
┌→Immersion in 5% NaCl at 30° C.: 30 minutes──┐inclusive
│  Wetting in 95% RH at 50° C.: 60 minutes    │of trans-
└──Drying at 60° C.: 30 minutes               ┘port time
```

In Tables 11 and 12, the corrosion resistance was evaluated at the predetermined cycle number. Incidentally, a plate sample was tested after cross cuts had been formed in the lower portion.

At the test for evaluation of the corrosion resistance after working, a sample subjected to the draw-beading test under the same conditions as described in Example 1 was used, and the corrosion test was carried out after 600 cycles. The maximum blister width was measured and the corrosion resistance was expressed by ½ of the measured maximum blister width value. Standards for evaluation of the test results were the same as those described in Example 1.

TABLE 11 - a

| No. | A B | C | D B | E | G (*1) | F Y B (*2) | F Y I (*3) | F Y-1 B (*4) | F Y-1 I (*5) |
|---|---|---|---|---|---|---|---|---|---|
| Samples of the invention | | | | | | | | | |
| 1 | Ni—Zn plating | 20 | Coating type | 50 | 2 | 1 | 70/30 | A | 2 |
| 2 | " | " | " | " | " | " | " | " | " |
| 3 | " | " | " | " | " | " | " | " | " |
| 4 | " | " | " | " | " | " | " | " | " |
| 5 | " | " | " | " | " | " | " | " | " |
| 6 | " | " | " | " | " | " | " | " | " |
| 7 | " | " | " | " | " | " | " | " | " |
| 8 | " | " | " | " | " | " | " | " | " |
| 9 | " | " | " | " | " | " | " | " | " |
| 10 | " | " | " | " | " | " | " | " | 0.1 |
| 11 | " | " | " | " | " | " | " | " | 0.5 |
| 12 | " | " | " | " | " | " | " | " | 10 |
| 13 | " | " | " | " | " | " | " | " | 15 |
| 14 | " | " | " | " | " | " | " | B | 2 |
| 15 | " | " | " | " | " | " | 99/1 | A | " |
| 16 | " | " | " | " | " | " | 90/10 | " | " |
| 17 | " | " | " | " | " | " | 50/50 | " | " |
| 18 | " | " | " | " | " | " | 30/70 | " | " |
| 19 | " | " | " | " | " | 2 | 80/20 | " | " |
| 20 | " | " | " | " | " | 3 | " | " | " |
| 21 | " | " | " | " | " | 4 | " | " | " |
| 22 | " | " | " | " | " | 5 | " | " | " |
| 23 | " | " | " | " | 1 | 1 | " | " | " |
| 24 | " | " | " | " | 3 | " | " | " | " |
| 25 | " | " | " | " | 4 | " | " | " | " |
| 26 | " | " | " | " | 5 | " | " | " | " |
| 27 | " | " | " | " | 8 | " | " | " | " |
| 28 | " | " | " | " | 9 | " | " | " | " |

| No. | F Y-2 (*6) | F Y-2 (*7) | J | K | M 600 cycles | N 600 cycles | O P | O P-1 | R P | R P-1 | S |
|---|---|---|---|---|---|---|---|---|---|---|---|
| Samples of the invention | | | | | | | | | | | |
| 1 | — | — | 1.1 | 80 | ○ | ○ | ○+ | ○+ | ○ | ○ | |
| 2 | — | — | " | 100 | ○+ | ○+ | ⊚ | ⊚ | ⊚ | ⊚ | |
| 3 | — | — | " | 150 | ○+ | ○+ | ⊚ | ⊚ | ○ | ⊚ | |
| 4 | — | — | " | 200 | ○+ | ○+ | ⊚ | ⊚ | ⊚ | ⊚ | |
| 5 | — | — | " | 250 | ○ | ○ | ⊚ | ⊚ | ⊚ | ⊚ | |
| 6 | — | — | 0.1 | 150 | ○ | ○ | ⊚ | ⊚ | ⊚ | ⊚ | |
| 7 | — | — | 0.3 | " | ○+ | ○+ | ⊚ | ⊚ | ⊚ | ⊚ | |
| 8 | — | — | 2.0 | " | ○+ | ○+ | ⊚ | ⊚ | ⊚ | ⊚ | |
| 9 | — | — | 3.5 | " | ○+ | ○+ | ⊚ | ⊚ | ⊚ | ⊚ | U |
| 10 | — | — | 1.1 | " | ○ | ○ | ⊚ | ⊚ | ⊚ | ⊚ | |
| 11 | — | — | " | " | ○+ | ○+ | ⊚ | ⊚ | ⊚ | ⊚ | |
| 12 | — | — | " | " | ○+ | ○+ | ⊚ | ⊚ | ⊚ | ⊚ | |
| 13 | — | — | " | " | ○+ | ○+ | ⊚ | ⊚ | ⊚ | ⊚ | U-1 |
| 14 | — | — | " | " | ○+ | ○+ | ⊚ | ⊚ | ⊚ | ⊚ | |
| 15 | — | — | " | " | ○ | ○ | ⊚ | ⊚ | ⊚ | ⊚ | |
| 16 | — | — | " | " | ○+ | ○+ | ⊚ | ⊚ | ⊚ | ⊚ | |
| 17 | — | — | " | " | ○+ | ○+ | ⊚ | ⊚ | ⊚ | ⊚ | |
| 18 | — | — | " | " | ○+ | ○+ | ○+ | ○+ | ⊚ | ⊚ | |
| 19 | — | — | " | " | ○+ | ○+ | ⊚ | ⊚ | ⊚ | ⊚ | |
| 20 | — | — | " | " | ○+ | ○+ | ⊚ | ⊚ | ⊚ | ⊚ | |
| 21 | — | — | " | " | ○+ | ○+ | ⊚ | ⊚ | ⊚ | ⊚ | |
| 22 | — | — | " | " | ○− | ○− | ⊚ | ⊚ | ⊚ | ⊚ | |
| 23 | — | — | " | " | ○− | ○− | ○+ | ○+ | ○ | ○ | |

TABLE 11 - a-continued

| | | | | | | | | | | |
|---|---|---|---|---|---|---|---|---|---|---|
| 24 | — | — | " | " | + | + | ◉ | ◉ | ◉ | ◉ |
| 25 | — | — | " | " | + | + | ◉ | ◉ | ◉ | ◉ |
| 26 | — | — | " | " | — | — | ○+ | ○+ | ○ | ○ |
| 27 | — | — | " | " | + | + | ◉ | ◉ | ◉ | ◉ |
| 28 | — | — | " | " | + | + | ◉ | ◉ | ◉ | ◉ |

Note:
A through U: Same as above
Y-1: Silan compound
Y-2: Other additive
U-1: Slight increase of cost of liquid TABLE 11 - b

| | A | | D | | G | F | | | | |
|---|---|---|---|---|---|---|---|---|---|---|
| | | | | | | Y | | Y-1 | | |
| No. | B | C | B | E | (*1) | B (*2) | I (*3) | B (*4) | I (*5) | | |
| Sample of the invention | | | | | | | | | | |
| 29 | Ni—Zn plating | 20 | Coating type | 50 | 10 | 1 | 70/30 | A | 2 | |
| 30 | " | " | " | 1 | 2 | " | " | " | " | |
| 31 | " | " | " | 10 | " | " | " | " | " | |
| 32 | " | " | " | 200 | " | " | " | " | " | |
| 33 | " | " | " | 1000 | " | " | " | " | " | |
| 34 | " | " | — ↑ Electrolytic type | 200 | " | " | " | " | " | |
| 35 | Fe—Zn | 40 | Coating type | 50 | " | " | " | " | " | |
| 36 | Zn—Mn | 20 | " | " | " | " | " | " | " | |
| 37 | Zn | 40 | " | " | " | " | " | " | " | |
| 38 | Ni—Zn | 20 | " | " | " | " | " | " | " | |
| 39 | " | " | " | " | " | " | " | " | " | |
| 40 | " | " | " | " | " | " | " | " | " | |
| 41 | " | " | " | " | " | " | " | " | " | |
| 42 | " | " | " | " | " | " | " | " | " | |
| 43 | " | " | " | " | " | " | 99/1 | " | " | |
| 44 | " | " | " | " | " | " | 90/10 | " | " | |
| 45 | " | " | " | " | " | " | 50/50 | " | " | |
| 46 | " | " | " | " | " | " | 70/30 | " | " | |
| 47 | " | " | " | " | " | " | " | " | " | |
| 48 | " | " | " | " | " | " | " | " | " | |
| 49 | " | " | " | " | " | " | " | " | " | |
| 50 | " | " | " | " | " | " | " | " | " | |
| 51 | " | " | " | " | " | " | " | " | " | |
| 52 | " | " | " | " | " | " | 99/1 | " | " | |
| 53 | " | " | " | " | " | " | " | " | " | |
| 54 | " | " | " | " | " | " | 70/30 | " | " | |

| | F | | | M | N | | | | | |
|---|---|---|---|---|---|---|---|---|---|---|
| | Y-2 | | | 600 | 600 | O | | R | | |
| No. | B (*6) | I (*7) | J | K | cycles | P | P-1 | P | P-1 | S |
| Samples of the invention | | | | | | | | | | |
| 29 | — | — | 1.1 | 150 | ○— | ○— | ○+ | ○+ | ○ | ○ | |
| 30 | — | — | " | " | ○— | ○— | ◉ | ◉ | ◉ | ◉ | |
| 31 | — | — | " | " | ○+ | ○+ | ◉ | ◉ | ◉ | ◉ | |
| 32 | — | — | " | " | ○+ | ○— | ◉ | ◉ | ◉ | ◉ | |
| 33 | — | — | " | " | ○+ | ○+ | ◉ | ◉ | ◉ | ◉ | U |
| 34 | — | — | " | " | ○— | ○ | ◉ | ◉ | ◉ | ◉ | |
| 35 | — | — | " | " | ○+ | ○+ | ◉ | ◉ | ◉ | ◉ | |
| 36 | — | — | " | " | ○— | ○— | ◉ | ◉ | ◉ | ◉ | |
| 37 | — | — | " | " | ○— | ○— | ◉ | ◉ | ◉ | ◉ | |
| 38 | 1 | 99/1 | " | " | ○+ | ○+ | ◉ | ◉ | ◉ | ◉ | |
| 39 | " | 95/5 | " | " | ◉ | ◉ | ◉ | ◉ | ◉ | ◉ | |
| 40 | " | 75/25 | " | " | ◉ | ◉ | ◉ | ◉ | ◉ | ◉ | Note: |
| 41 | " | 65/35 | " | " | ◉ | ◉ | ◉ | ◉ | ◉ | ◉ | A through U: |
| 42 | " | 60/40 | " | " | ○+ | ○+ | ○+ | ○+ | ○+ | ○+ | Same as above |
| 43 | " | 80/20 | " | " | ○+ | ○+ | ◉ | ◉ | ◉ | ◉ | |
| 44 | " | " | " | " | ◉ | ◉ | ◉ | ◉ | ◉ | ◉ | |
| 45 | " | " | " | " | ◉ | ◉ | ◉ | ◉ | ◉ | ◉ | |
| 46 | 2 | " | " | " | ◉ | ◉ | ◉ | ◉ | ◉ | ◉ | |
| 47 | 3 | " | " | " | ◉ | ◉ | ◉ | ◉ | ◉ | ◉ | |
| 48 | 3 | " | " | " | ◉ | ◉ | ◉ | ◉ | ◉ | ◉ | |
| 49 | 5 | " | " | " | ◉ | ◉ | ◉ | ◉ | ◉ | ◉ | |
| 50 | 6 | " | " | " | ◉ | ◉ | ◉ | ◉ | ◉ | ◉ | |
| 51 | 8 | " | " | " | ◉ | ◉ | ◉ | ◉ | ◉ | ◉ | |
| 52 | 1 | 97/3 | " | " | ○+ | ○+ | ◉ | ◉ | ◉ | ◉ | |
| 53 | 1 | 60/40 | " | " | ○+ | ○+ | ○+ | ○+ | ○+ | ○+ | |

TABLE 11 - b-continued

| 54 | 1 | 80/20 | " | " | o+ | o+ | ⊚ | ⊚ | ⊚ | ⊚ |

TABLE 12

| | A | | D | | G | F Y | | F Y-1 | |
|---|---|---|---|---|---|---|---|---|---|
| No. | B | C | B | E | (*1) | B (*2) | I (*3) | B (*4) | I (*5) |
| Comparative samples | | | | | | | | | |
| 1 | Ni—Zn plating | 20 | Coating type | 50 | 2 | 1 | 70/30 | A | 2 |
| 2 | " | " | " | " | " | " | " | " | " |
| 3 | " | " | " | " | " | 1 | 1 | " | " |
| 4 | " | " | " | " | " | " | " | " | 0 |
| 5 | " | " | " | " | " | — | — | — | — |
| 6 | " | " | " | " | " | — | — | A | 2 |
| 7 | " | " | " | " | " | 1 | 20/80 | " | " |
| 8 | " | " | " | " | 6 | " | 70/30 | " | " |
| 9 | " | " | " | " | 7 | " | " | " | " |
| 10 | " | " | " | " | 11 | — | — | — | — |
| 11 | " | " | " | 0 | 2 | 1 | 70/30 | A | 2 |
| 12 | " | " | " | 1500 | " | " | " | " | " |
| 13 | " | " | " | 50 | " | " | " | " | 2 |
| 14 | " | " | " | " | " | " | 20/80 | " | " |
| 15 | " | " | " | " | " | " | 70/30 | " | " |
| 16 | " | " | " | " | " | " | 20/80 | " | " |

| | F Y-2 | | | | M 600 | N 600 | O | | R | | |
|---|---|---|---|---|---|---|---|---|---|---|---|
| | B (*6) | I (*7) | J | K | cycles | | P | P-1 | P | P-1 | S |
| Comparative samples | | | | | | | | | | | |
| 1 | — | — | 1.1 | | △ | △ | ○ | ○ | X | | |
| 2 | — | — | " | 300 | △ | △ | ⊚ | ⊚ | X | X | |
| 3 | — | — | 5.0 | " | ○ | ○ | ⊚ | ⊚ | ⊚ | ⊚ | U |
| 4 | — | — | 1.1 | " | △ | △ | ⊚ | ⊚ | ⊚ | ⊚ | |
| 5 | — | — | " | " | △ | △ | ⊚ | ⊚ | ⊚ | ⊚ | |
| 6 | — | — | " | " | △ | △ | ⊚ | ⊚ | ⊚ | ⊚ | |
| 7 | — | — | " | " | △ | ○ | X | X | X | X | |
| 8 | — | — | " | " | △ | △ | ○— | ○— | X | X | |
| 9 | — | — | " | " | X | X | ⊚ | ⊚ | X | X | |
| 10 | — | — | — | 260 | X | X | ○+ | ○+ | △ | X | |
| 11 | — | — | 1.1 | 150 | X | X | — | — | — | — | |
| 12 | — | — | " | " | ○ | ○ | ⊚ | ⊚ | ⊚ | ⊚ | V, X |
| 13 | 1 | 50/50 | " | " | △ | △ | △ | X | X | X | |
| 14 | " | 80/20 | " | " | △ | ○+ | X | X | X | X | |
| 15 | 7 | 80/20 | " | " | ○— | ○— | △ | △ | X | X | |
| 16 | 1 | 50/50 | " | " | △ | ○+ | X | X | X | X | |

Note: A through X: Same as above
(*1): See Table 13
(*2): See Table 14
(*3): Weight ratio of base resin/silica
(*4): See Table 16
(*5): Amount (parts) of the solid per 100 parts of the sum of the solids of the base resin and silica component
(*6): See Table 15
(*7): Base resin/chromium compoud or aluminum phosphomolybdate

TABLE 13

| No,. | Base resin | Curing agent | Catalyst |
|---|---|---|---|
| 1 | A 100 parts | a 5 parts | Dibutyl tin dilaurate 0.2 parts |
| 2 | " | 1 25 parts | Dibutyl tin dilaurate 1.0 parts |
| 3 | " | a 25 parts | — |
| 4 | " | a 50 parts | Dibutyl tin dilaurate 2.0 parts |
| 5 | " | 1 80 parts | Dibutyl tin dilaurate 3.2 parts |
| 6 | " | 1 100 parts | Dibutyl tin dilaurate 4.0 parts |
| 7 | " | — | — |
| 8 | " | b 10 parts | Bismuth nitrate 1.0 parts |
| 9 | " | b 20 parts | N—ethylformalin 2.0 parts |
| 10 | Product obtained by adding 30 g/l of acetic acid to base resin A obtained in "Base Resin" in Example 1 to render it water-soluble | | |
| 11 | Organic composite silicate (silica sol content = 40%, acryl silicate/epoxy silicate ratio = 30/70 prepared according to Japanese Patent Application Laid-Open No. 174879/85 | | |

TABLE 14

| 1 | Hydrophobic ultra-fine particulate silica (supplied by Nihon Aerozil Sha R 811) |
|---|---|
| 2 | Hydrophobic ultra-fine particulate silica (supplied by Nihon Aerozil Sha R 805) |
| 3 | Colloidal silica dispersed in organic solvent (supplied by Shokubai Kasei Kogyo Sha OSCAL 1432) |
| 4 | Colloidal silica dispersed in organic solvent |

TABLE 14-continued (supplied by Shokubai Kasei Kogyo Sha (OSCAL 1622)
5   Hydrophilic silica (fumed silica)
    (supplied by Nihon Aerozil Sha R 200)

TABLE 15

| No. | Additive |
|---|---|
| 1 | Strontium chromate (supplied by Kikuchi Shikiso Kogyo Sha) |
| 2 | Lead chromate (supplied by Kikuchi Shikiso Kogyo Sha) |
| 3 | Zinc chromate (supplied by Kikuchi Shikiso Kogyo Sha) |
| 4 | Barium chromate (supplied by Kikuchi Shikiso Kogyo Sha) |
| 5 | Clacium chromate (supplied by Kikuchi Shikiso Kogyo Sha) |
| 6 | Potassium zinc chromate (supplied by Kikuchi Shikiso Kogyo Sha) |
| 7 | Potassium chromate (Nihon Kagaku Kogyo Sha) |
| 8 | Aluminum phosphomolybdate (supplied by Kikuchi Shikiso Kogyo Sha) |

TABLE 16

| No. | Silan compound |
|---|---|
| A | KBM 503 supplied by Shin-etsu Chemical Co., Ltd. |
| B | KBM 403 supplied by Shin-etsu Chemical Co., Ltd. |

EXAMPLE 4

Steel plates of the present invention for the inner face of a car body, which differed in the deposited metal component and the amount deposited of the film as shown in Table 17, were subjected to the adhesion test and corrosion resistance test. Comparative steel plates shown in Table 18 were similarly tested.

The deposited metal component was the same as described in Example 1. The steel plates having a chromate film and a basic epoxy resin film, shown in the tables, were prepared by alkali-degreasing the metal-deposited steel plate, washing it with water, drying it, coating a coating type coating liquid on the deposited steel plate by a roll coater or immersing the metal-deposited steel plate in an electrolytic chromate treatment bath to form an electrolytic chromate film, drying the treated steel plate and coating a basic epoxy resin liquid for a second layer on the chromate film, followed by drying, heat treatment and air cooling.

Coating type chromate treatment conditions
The coating type chromate treatment conditions were the same as described in Example 1.
Electrolytic chromate treatment conditions
The electrolytic chromate treatment conditions were the same as described in Example 1.
Resin composition
The base resin and curing agent described below were mixed at a ratio shown in Table 19 to form a resin composition.

Base resin
The same base resin as used in Example 1 was used.
Curing agent
The same curing agent as used in Example 1 was used.

At the adhesion test, a phosphate-treated sample was electrodeposition-coated with a cation electrodeposition paint No. 9210 supplied by Kansai Paint to form a coating film having a thickness of $20\mu$, and Amilac No. 002 supplied by Kansai Paint was spray-coated in a thickness of $40\mu$, and the primary adhesion and secondary adhesion were tested. The primary adhesion test was carried out under the same conditions as described in Example 1. At the secondary adhesion test, the coated sample was immersed in warm water (pure water) at 40° C. for 240 hours and was taken out, and in the same manner as described in Example 1, square cuts were formed at intervals of 1 mm within 30 minutes and an adhesive tape was applied to the cut surface and was then peeled.

The corrosion resistance was tested according to the cycle test method comprising the following steps as one cycle

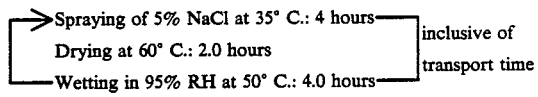

The corrosion resistance was evaluated after predetermined cycles shown in Tables 17 and 18.

At the test of evaluating the corrosion resistance of the uncoated plate after working, a sample subjected to the draw-beading test in the same manner as described in Example 1 was tested after 50 cycles.

At the test for evaluation of the corrosion resistance after coating, cross cuts were formed on the coating after the electrodeposition coating and the sample was tested for 100 cycles. The maximum blister width was measured and the corrosion resistance was expressed by ½ of the measured maximum blister width value. Evaluation standards adopted at the respective tests were as follows.

(1) Corrosion resistance of uncoated plate after working
⊚: no red rusting
○+: red rusting-occurring area ratio smaller than 5%
○: red rusting-occurring area ratio of 5 to 10%
o: red rusting occurring area ratio of 10 to 20%
Δ: red rusting-occurring area ratio of 20 to 50%
X: red rusting-occurring area ratio larger than 50%
(2) Corrosion resistance after coating
The same standard as adopted in Example 1 was adopted.
(3) 2-Coat adhesion
The same standard as adopted in Example 1 was adopted.

TABLE 17

| | | | | | | | F | | | | | M | N | | | |
|---|---|---|---|---|---|---|---|---|---|---|---|---|---|---|---|---|
| | | | | | | | | H | | | | 50 | 100 | O | | |
| | A | | D | | G | B | I | | | | | | | | | |
| No. | B | C | B | E | (*2) | (*3) | (*1) | J | K | cycles | cycles | P | P-1 | S |
| Samples of the invention | | | | | | | | | | | | | | |
| 1 | Ni—Zn | 20 | | 50 | 1 | 1 | 5 | 1.0 | 150 | ○— | ○+ | ⊚ | ⊚ | |
| 2 | " | " | " | " | " | " | 20 | " | " | ⊚ | ⊚ | ⊚ | ⊚ | |

TABLE 17-continued

| | A | | D | | F | | | | | | M | N | O | | S |
|---|---|---|---|---|---|---|---|---|---|---|---|---|---|---|---|
| | | | | | G | H | | | | | 50 | 100 | | | |
| | | | | | | B | I | | | | | | | | |
| No. | B | C | B | E | (*2) | (*3) | (*1) | J | K | | cycles | cycles | P | P-1 | |
| 3 | " | " | " | " | " | " | 40 | " | " | | ⊚ | ⊚ | ⊚ | ⊚ | |
| 4 | " | " | " | " | " | " | 60 | " | " | | ⊚− | ○ | ○+ | ○+ | |
| 5 | " | " | " | " | " | 2 | 5 | " | " | | ⊚− | ○ | ⊚ | ⊚ | |
| 6 | " | " | " | " | " | " | 20 | " | " | | ● | ⊚ | ⊚ | ⊚ | |
| 7 | " | " | " | " | " | " | 40 | " | " | | ● | ⊚ | ⊚ | ⊚ | |
| 8 | " | " | " | " | " | " | 60 | " | " | | ○ | ⊚ | ○+ | ○+ | |
| 9 | " | " | " | " | " | 3 | 5 | " | " | | ○− | ○ | ● | ⊚ | |
| 10 | " | " | " | " | " | " | 20 | " | " | | ⊚ | ⊚ | ⊚ | ⊚ | |
| 11 | " | " | " | " | " | " | 40 | " | " | | ⊚ | ⊚ | ⊚ | ⊚ | |
| 12 | " | " | " | " | " | " | " | 0.3 | " | | ○− | ○− | ⊚ | ⊚ | |
| 13 | " | " | " | " | " | " | " | 0.6 | " | | ○+ | ⊚ | ⊚ | ⊚ | |
| 14 | " | " | " | " | " | " | " | 2.0 | " | | ⊚ | ⊚ | ⊚ | ⊚ | |
| 15 | " | " | " | " | " | " | " | 3.5 | " | | ⊚ | ⊚ | ⊚ | ⊚ | U |
| 16 | Ni—Zn plating | 20 | Coating type | " | " | 3 | " | 1.0 | 60 | | ⊚ | ⊚ | ⊚ | ● | |
| 17 | Ni—Zn plating | " | Coating type | " | " | " | " | " | 100 | | ⊚ | ⊚ | ⊚ | ● | |
| 18 | Ni—Zn plating | " | Coating type | " | " | " | " | " | 200 | | ○ | ○+ | ● | ● | |
| 19 | Ni—Zn plating | " | Coating type | " | " | 4 | " | " | 150 | | ⊚ | ⊚ | ⊚ | ⊚ | |
| 20 | Ni—Zn plating | " | Coating type | " | " | 5 | " | " | " | | ○− | ○− | ⊚ | ⊚ | |
| 21 | Ni—Zn plating | " | Coating type | " | " | 6 | " | " | " | | ○− | ○− | ● | ⊚ | |
| 22 | Ni—Zn plating | " | Coating type | " | " | 7 | " | " | " | | ○+ | ○+ | ⊚ | ⊚ | |
| 23 | Ni—Zn plating | " | Coating type | " | II | 1 | " | " | " | | ⊚ | ⊚ | ⊚ | ⊚ | |
| 24 | Ni—Zn plating | " | Coating type | " | " | 2 | " | " | " | | ⊚ | ⊚ | ⊚ | ⊚ | |
| 25 | Ni—Zn plating | " | Coating type | " | " | 3 | " | " | " | | ⊚ | ⊚ | ⊚ | ⊚ | |
| 26 | Ni—Zn plating | " | Coating type | " | " | 4 | " | " | " | | ⊚ | ⊚ | ⊚ | ⊚ | |
| 27 | Ni—Zn plating | " | Coating type | " | " | 5 | " | " | " | | ○− | ○− | ⊚ | ⊚ | |
| 28 | Ni—Zn plating | " | Coating type | " | " | 6 | " | " | " | | ○− | ○− | ● | ⊚ | |
| 29 | Ni—Zn plating | " | Coating type | 5 | I | 3 | " | " | " | | ○− | ○− | ⊚ | ⊚ | |
| 30 | Ni—Zn plating | " | Coating type | 15 | " | " | " | " | " | | ○+ | ○+ | ⊚ | ⊚ | |
| 31 | Ni—Zn plating | " | Coating type | 200 | " | " | " | " | " | | ⊚ | ⊚ | ⊚ | ⊚ | |
| 32 | Ni—Zn plating | " | Coating type | 400 | " | " | " | " | " | | ⊚ | ⊚ | ○+ | ○+ | |
| 33 | Ni—Zn plating | " | Electrolytic type | 50 | " | " | " | " | " | | ○− | ○− | ⊚ | ⊚ | |
| 34 | Fe—Zn | 40 | Coating type | " | " | " | " | " | " | | ○− | ○− | ⊚ | ⊚ | |
| 35 | Zn—Mn plating | 20 | Coating type | " | " | " | " | " | " | | ⊚ | ⊚ | ⊚ | ⊚ | |
| 36 | Zn plating | 40 | Coating type | " | " | " | " | " | " | | ○− | ○− | ● | ⊚ | |

Note:
A through U: Same as above

TABLE 18

| | A | | D | | F | | | | | | | O | | S |
|---|---|---|---|---|---|---|---|---|---|---|---|---|---|---|
| | | | | | G | H | | | | | | | | |
| | | | | | | B | I | | | | | | | |
| No. | B | C | B | E | | | | J | K | M | N | P | P-1 | |
| Comparative samples | | | | | | | | | | | | | | A through V: |
| 1 | Ni—Zn plating | 20 | Coating type | 50 | — | — | — | — | Air dry | X | X | ⊚ | ⊚ | Same as above |
| 2 | Ni—Zn plating | " | — | — | 1 | 3 | 40 | 10 | 150 | X | X | ○ | ○ | |
| 3 | Ni—Zn plating | " | Coating type | 50 | " | " | " | " | 260 | Δ | Δ | ○+ | ○+ | |
| 4 | Ni—Zn plating | " | Coating type | " | " | " | " | " | 300 | X | X | ○+ | ○+ | |
| 5 | Ni—Zn plating | " | Coating type | " | " | " | " | 0.08 | 150 | Δ | Δ | ⊚ | ⊚ | |
| 6 | Ni—Zn plating | " | Coating | " | " | " | " | 4.5 | " | ⊚ | ⊚ | ⊚ | ⊚ | |

TABLE 18-continued

| | A | | | D | | | F | | | | | | | O | | |
|---|---|---|---|---|---|---|---|---|---|---|---|---|---|---|---|---|
| | | | | | | | | H | | | | | | | | |
| No. | B | C | | B | E | G | B | I | J | K | M | N | P | P-1 | S |
| 7 | plating Ni—Zn | " | | type Coating | " | " | — | — | 1.0 | " | X | X | ◯ | ◯ | |
| 8 | plating Ni—Zn | " | | type Coating | " | " | 3 | 100 | " | " | X | △ | X | X | |
| 9 | plating Ni—Zn | " | | type Coating | " | III | 6 | 40 | " | " | △ | △ | ◯ | ◯ | |
| 10 | plating Ni—Zn | " | | type Coating | " | IV | " | " | " | " | ◯ | ◯ | X | X | |
| 11 | plating Ni—Zn | " | | type Coating | " | IV | " | " | " | 260 | △ | ◯ | ◯+ | ◯+ | |
| 12 | plating Ni—Zn | " | | type Coating | 1500 | 1 | 3 | " | " | 150 | ◉ | ◉ | ◯ | ◯ | |
| 13 | plating | | | Zinchro - metal | | | | | | | X | △ | ◉ | ◉ | |

Note:
(*1): Amount (parts) of the solid added per 100 parts of the solids of the cationic base resin and additive.
(*2): See Table 19
(*3): See Table 20

TABLE 19

| No. | Base Resin |
|---|---|
| I | |
| II | |
| III | Product obtained by adding 30 g/l of acetic acid to resin A obtained in "Base Resin" in Example 1 to render it water-soluble |
| IV | Organic composite silicate (silica sol content = 40%, acrylic/epoxy ratio = 30/70) prepared according to Japanese Patent Application Laid-Open Specification No. 174879/85 |

TABLE 20

| No. | Additive |
|---|---|
| 1 | Colloidal silica dispersed in organic solvent (supplied by Shokubai Kasei Kogyo Sha OSCAL 1432) |
| 2 | Colloidal silica dispersed in organic solvent (supplied by Shokubai Kasei Kogyo Sha OSCAL 1622) |
| 3 | Hydrophobic ultra-fine particulate silica (supplied by Nihon Aerozil Sha R 811) |
| 4 | Hydrophobic ultra-fine particulate silica (supplied by Nihon Aerozil Sha R 805) |
| 5 | Hydrophilic ultra-fine particulate silica silica) (supplied by Nihon Aerozil Sha R 200) |
| 6 | Aluminum phosphomolybdate (supplied by Kikuchi Shikiso Kogyo) |
| 7 | 100 parts (*1) of No. 1 + 100 parts of aluminum phosphomolybdate |

Note: (*1) Mixing solid ratio

EXAMPLE 5

Steel plates of the present invention for the inner face of a car body, which differed in the deposited metal component and the amount deposited of the film as shown in Table 21, were subjected to the adhesion test and corrosion resistance test. Furthermore, comparative steel plates shown in Table 22 were similarly tested.

The starting steel plate, the process for the preparation of the base resin, the test methods and the evaluation methods were the same as described in Example 5.

TABLE 21

| | A | | D | | | F | | | | | | | O | | |
|---|---|---|---|---|---|---|---|---|---|---|---|---|---|---|---|
| | | | | | | | H-1 | | H-2 | | | | | | |
| No. | B | C | B | E | G (*3) | B (*4) | I (*1) | B (*5) | I (*2) | J | K | P | P-1 | S |
| Samples of the invention | | | | | | | | | | | | | | | |
| 1 | Ni—Zn plating | 20 | Coating type | 50 | 1 | 3 | 2 | 1 | 2 | 1.0 | 150 | ◯− | ◉ | ◉ |
| 2 | Ni—Zn plating | " | Coating type | " | " | " | 10 | " | 5 | " | " | ◉ | ◉ | ◉ |
| 3 | Ni—Zn plating | " | Coating type | " | " | " | 50 | " | 25 | " | " | ◉ | ◉ | ◉ |
| 4 | Ni—Zn plating | " | Coating type | " | " | " | 70 | " | 40 | " | " | ◯ | ◯ | ◯ |
| 5 | Ni—Zn plating | " | Coating type | " | " | " | 5 | " | 15 | " | " | ◯− | ◉ | ◉ |
| 6 | Ni—Zn plating | " | Coating type | " | " | " | 30 | " | 2 | " | " | ◯− | ◉ | ◉ |
| 7 | Ni—Zn plating | " | Coating type | " | " | 1 | 2 | 2 | 2 | " | " | ◯− | ◉ | ◉ |
| 8 | Ni—Zn plating | " | Coating type | " | " | " | 10 | " | 5 | " | " | ◉ | ◉ | ◉ |
| 9 | Ni—Zn plating | " | Coating type | " | " | " | 50 | " | 25 | " | " | ◉ | ◉ | ◉ |
| 10 | Ni—Zn plating | " | Coating type | " | " | " | 70 | " | 40 | " | " | ◯ | ◯ | ◯ |
| 11 | Ni—Zn plating | " | Coating type | " | " | " | 5 | " | 15 | " | " | ◯− | ◉ | ◉ |
| 12 | Ni—Zn | " | Coating | " | " | " | 30 | " | 2 | " | " | ◯− | ◉ | ◉ |

TABLE 21-continued

| | A | | D | | G | F H-1 | | F H-2 | | | | | O | | |
|---|---|---|---|---|---|---|---|---|---|---|---|---|---|---|---|
| No. | B | C | B | E | (*3) | B (*4) | I (*1) | B (*5) | I (*2) | J | K | | P | P-1 | S |
| 13 | Ni—Zn plating | " | Coating type | " | 3 | " | 3 | 15 | " | " | ◎ | | ◎ | ◎ | |
| 14 | Ni—Zn plating | " | Coating type | " | " | " | 4 | " | " | " | ◎ | | ◎ | ◎ | |
| 15 | Ni—Zn plating | " | Coating type | " | " | " | 5 | " | " | " | ◎ | | ◎ | ◎ | |
| 16 | Ni—Zn plating | " | Coating type | " | " | " | 6 | " | " | " | ◎ | | ◎ | ◎ | |
| 17 | Ni—Zn plating | " | Coating type | " | " | 1 | " | 1 | " | " | ◎ | | ◎ | ◎ | |
| 18 | Ni—Zn plating | " | Coating type | " | " | 2 | " | " | " | " | ◎ | | ◎ | ◎ | |
| 19 | Ni—Zn plating | " | Coating type | " | " | 3 | " | " | " | " | ◎ | | ◎ | ◎ | |
| 20 | Ni—Zn plating | " | Coating type | " | " | 4 | " | " | " | " | ◎ | | ◎ | ◎ | |
| 21 | Ni—Zn plating | " | Coating type | " | " | 5 | " | " | " | " | ○− | | ◎ | ◎ | |
| 22 | Ni—Zn plating | " | Coating type | " | " | 6 | " | " | " | " | ○ | | ◎ | ◎ | |
| 23 | Ni—Zn plating | " | Coating type | " | " | 7 | " | " | " | " | ○+ | | ◎ | ◎ | |
| 24 | Ni—Zn plating | " | Coating type | " | II | 3 | 2 | " | 2 | " | ○− | | ◎ | ◎ | |
| 25 | Ni—Zn plating | " | Coating type | " | " | " | 10 | " | 5 | " | ◎ | | ◎ | ◎ | |
| 26 | Ni—Zn plating | " | Coating type | " | " | " | 50 | " | 25 | " | ◎ | | ◎ | ◎ | |
| 27 | Ni—Zn plating | " | Coating type | " | " | " | 70 | " | 40 | " | ○− | | ○ | ○ | |
| 28 | Ni—Zn plating | " | Coating type | " | " | " | 5 | " | 15 | " | ○− | | ◎ | ◎ | |
| 29 | Ni—Zn plating | " | Coating type | " | " | " | 30 | " | 2 | " | ○− | | ◎ | ◎ | |
| 30 | Ni—Zn plating | " | Coating type | " | 1 | " | " | " | 15 | 0.3 | " | ○− | ◎ | ◎ | |
| 31 | Ni—Zn plating | " | Coating type | " | " | " | " | " | " | 0.6 | " | ○+ | ◎ | ◎ | |
| 32 | Ni—Zn plating | " | Coating type | " | " | " | " | " | " | 2.0 | " | ◎ | ◎ | ◎ | |
| 33 | Ni—Zn plating | " | Coating type | " | " | " | " | " | " | 3.5 | " | ◎ | ◎ | ◎ | U |
| 34 | Ni—Zn plating | " | Coating type | " | " | " | " | " | " | 1.0 | 60 | ◎ | ◎ | ◎ | |
| 35 | Ni—Zn plating | " | Coating type | " | " | " | " | " | " | " | 100 | ◎ | ◎ | ◎ | |
| 36 | Ni—Zn plating | " | Coating type | " | " | " | " | " | " | " | 200 | ○ | ◎ | ◎ | |

TABLE 22

| | A | | D | | G | F H-1 | | F H-2 | | | | M 100 | O | | |
|---|---|---|---|---|---|---|---|---|---|---|---|---|---|---|---|
| No. | B | C | B | E | (*3) | B (*4) | I (*1) | B (*5) | I (*2) | J | K | cycles | P | P-1 | S |
| Comparative Samples | | | | | | | | | | | | | | | |
| 1 | Ni—Zn | 20 | Coating type | 50 | 1 | 3 | 5 | — | — | 1.0 | 150 | Δ | ◎ | ◎ | |
| 2 | " | " | Coating type | " | " | " | 10 | — | — | " | " | ○− | ◎ | ◎ | |
| 3 | " | " | Coating type | " | " | " | 50 | — | — | " | " | ○− | ◎ | ◎ | |
| 4 | " | " | Coating type | " | " | " | 70 | — | — | " | " | Δ | ○+ | ○+ | |
| 5 | " | " | Coating type | " | " | — | — | 1 | 2 | " | " | X | ◎ | ◎ | |
| 6 | " | " | Coating type | " | " | — | — | " | 5 | " | " | X | ◎ | ◎ | |
| 7 | " | " | Coating type | " | " | — | — | " | 25 | " | " | Δ | ◎ | ◎ | |
| 8 | " | " | Coating type | " | " | — | — | " | 40 | " | " | Δ | ◎ | ◎ | |
| 9 | " | " | Coating type | " | " | — | — | " | 80 | " | " | X | Δ | Δ | |

TABLE 22-continued

| | A | | D | E | G (*3) | F H-1 B (*4) | F H-1 I (*1) | F H-2 B (*5) | F H-2 I (*2) | J | K | M 100 cycles | O P | O P-1 | S |
|---|---|---|---|---|---|---|---|---|---|---|---|---|---|---|---|
| No. | B | C | B | | | | | | | | | | | | |
| 10 | " | " | Coating type | " | " | 1 | 30 | — | — | " | " | ○- | ◎ | ◎ | |
| 11 | " | " | Coating type | " | " | 2 | " | — | — | " | " | ○- | ◉ | ◎ | |
| 12 | " | " | Coating type | " | " | 4 | " | — | — | " | " | ○- | ◎ | ◎ | |
| 13 | " | " | Coating type | " | " | 5 | " | — | — | " | " | X | ◎ | ◉ | |
| 14 | " | " | Coating type | " | " | 6 | " | — | — | " | " | Δ | ◎ | ◎ | |
| 15 | " | " | Coating type | " | " | 7 | " | — | — | " | " | Δ | ◎ | ◉ | |
| 16 | " | " | Coating type | " | " | — | — | 2 | 15 | " | " | X | ◉ | ◎ | |
| 17 | " | " | Coating type | " | " | — | — | 3 | " | " | " | X | ◉ | ◉ | |
| 18 | " | " | Coating type | " | " | — | — | 4 | " | " | " | X | ◉ | ◎ | |
| 19 | Ni—Zn plating | " | Coating type | " | " | 7 | 30 | 5 | " | " | " | X | ◉ | ◎ | |
| 20 | Ni—Zn plating | " | Coating type | " | " | — | — | 6 | " | " | " | X | ◉ | ◎ | |
| 21 | Ni—Zn plating | " | Coating type | " | " | 3 | 30 | 7 | " | " | " | ○ | Δ | Δ | |
| 22 | Ni—Zn plating | " | Coating type | " | " | — | — | — | " | " | " | X | ○ | ○ | |
| 23 | Ni—Zn plating | " | Coating type | " | " | 3 | 80 | 1 | 60 | " | " | Δ | X | X | |
| 24 | Ni—Zn plating | " | Coating type | " | II | " | 30 | 7 | 15 | " | " | ○ | Δ | Δ | |
| 25 | Ni—Zn plating | " | Coating type | " | " | " | 80 | 1 | 60 | " | " | Δ | X | X | |
| 26 | Ni—Zn plating | " | Coating type | " | 1 | " | 30 | " | 15 | 0.08 | " | X | ◉ | ◎ | |
| 27 | Ni—Zn plating | " | Coating type | " | " | " | " | " | " | 4.5 | " | ◎ | ◎ | ◉ | V |
| 28 | Ni—Zn plating | " | Coating type | " | " | " | " | " | " | 1.0 | 260 | Δ | ○+ | ○+ | |
| 29 | Ni—Zn plating | " | Coating type | " | " | " | " | " | " | " | 300 | X | ○+ | ○+ | |

Note:
(*1): Amount (parts) of the added solid per 100 parts of the sum of the solid of the cationic base resin and additive (1)
(*2): Amount (parts) of the added solid per 100 parts of the sum of the solid of the cationic base resin and additive (2)
(*3): See Table 19 of Example 5
(*4): See Table 20 of Example 5
(*5): See Table 23

TABLE 23

| No. | Chromate compound |
|---|---|
| 1 | Strontium chromate (supplied by Kikuchi Shikiso Kogyo) |
| 2 | Lead chromate (supplied by Kikuchi Shikiso Kogyo) |
| 3 | Zinc chromate (supplied by Kikuchi Shikiso Kogyo) |
| 4 | Barium chromate (supplied by Kikuchi Shikiso Kogyo) |
| 5 | Calcium chromate (supplied by Kikuchi Shikiso Kogyo) |
| 6 | Potassium zinc chromate (supplied by Kikuchi Shikiso Kogyo) |
| 7 | Potassium chromate (supplied by Nihon Kagaku Kogyo) |

We claim:

1. A highly corrosion-resistant surface-treated steel plate compromising a zinc-deposited or zinc alloy-deposited steel plate, a chromate film formed on the surface of the steel plate and a film of a resin composition formed on the chromate film, said resin composition comprising a base resin obtained by adding at least one basic nitrogen atom and at least two primary hydroxyl groups to terminals of an epoxy resin and a polyisocyanate compound.

2. A highly corrosion-resistant surface-treated steel plate as set forth in claim 1, wherein the base resin/polyisocyanate compound weight ratio is in the range of from 100/5 to 100/80.

3. A highly corrosion-resistant surface-treated steel plate as set forth in claim 1 or 2, wherein the amount (dry base) deposited of chromium in the chromate film is 1 to 1000 mg/m², as calculated as metallic chromium, and the amount deposited of the film of the resin composition is 0.1 to 3.5 g/m².

4. A highly corrosion-resistant surface-treated steel plate as set forth in claim 1 or 2, wherein the amount (dry base) deposited of chromium in the chromate film is 10 to 200 mg/m², as calculated as metallic chromium, and the amount deposited of the film of the resin composition was 0.3 to 2.0 g/m².

5. A highly corrosion-resistant surface-treated steel plate as set forth in claim 1, wherein the base resin/polyisocyanate compound weight ratio is in the range of from 100/10 to 100/50.

6. A highly corrosion-resistant surface-treated steel plate comprising a zinc-deposited or zinc alloy-deposited steel plate, a chromate film formed on the surface of the steel plate and a film of a resin composition formed on the chromate film, said resin composition comprising a base resin obtained by adding at least one basic nitrogen atom and at least two primary hydroxyl groups to terminals of an epoxy resin, a polyisocyanate compound and silica, the base resin/silica weight ratio being in the range of from 99/1 to 30/70

7. A highly corrosion-resistant surface-treated steel plate as set forth in claim 6, wherein the base resin/polyisocyanate compound weight ratio is in the range of from 100/5 to 100/80.

8. A highly corrosion-resistant surface-treated steel plate as set forth in claim 6 or 7, wherein the base resin/silica weight ratio is in the range of from 90/10 to 30/70.

9. A highly corrosion-resistant surface-treated steel plate as set forth in claim 6 or 7, wherein the amount (dry base) deposited of chromium in the chromate film is 1 to 1000 mg/m$^2$, as calculated as metallic chromium, and the amount deposited of the film of the resin composition is 0.1 to 3.5 g/m$^2$.

10. A highly corrosion-resistant surface-treated steel plate as set forth in claim 6 or 7, wherein the base resin/silica weight ratio is in the range of from 80/20 to 30/70.

11. A highly corrosion-resistant surface-treated steel plate as set forth in claim 6 or 7, wherein the amount (dry base) deposited of chromium in the chromate film is 10 to 200 mg/m$^2$, as calculated as metallic chromium, and the amount deposited of the film of the resin composition is 0.3 to 2.0 g/m$^2$.

12. A highly corrosion-resistant surface-treated steel plate as set forth in claim 6, wherein the silica is hydrophobic silica.

13. A highly corrosion-resistant surface-treated steel plate as set forth in claim 6, wherein the base resin/polyisocyanate compound weight ratio is in the range of from 100/10 to 100/50.

14. A highly corrosion-resistant surface-treated steel plate comprising a zinc-deposited or zinc alloy-deposited steel plate, a chromate film formed on the steel plate and a film of a resin composition formed on the chromate film, said resin composition comprising a base resin obtained by adding at least one basic hydrogen atom and at least two primary hydroxyl groups to terminals of an epoxy resin, a polyisocyanate compound, silica and a chromium compound, the base resin/silica weight ratio being in the range of from 99/1 to 30/70 and the base resin/chromium compound weight ratio being in the range of from 99/1 to 60/40.

15. A highly corrosion-resistant surface-treated steel plate as set forth in claim 14, wherein the base resin/polyisocyanate compound weight ratio is in the range of from 100/5 to 100/80.

16. A highly corrosion-resistant surface-treated steel plate as set forth in claim 14 or 15, wherein the base resin/silica weight ratio is in the range of from 90/10 to 50/50.

17. A highly corrosion-resistant surface-treated steel plate as set forth in claim 14 or 15, wherein the weight ratio of the base resin/chromoum compound is in the range of from 97/3 to 65/35.

18. A highly corrosion-resistant surface-treated steel plate as set forth in claim 14 or 15, wherein the amount (dry base) deposited of chromium in the chromate film is 1 to 1000 mg/m$^2$, as calculated as metallic chromium, and the amount deposited of the film of the resin composition is 0.1 to 3.5 g/m$^2$.

19. A highly corrosion-resistant surface-treated steel plate as set forth in claim 14 or 15, wherein the base resin/silica weight ratio is in the range of form 80/20 to 60/40.

20. A highly corrosion-resistant surface-treated steel plate as set forth in claim 14 or 15, wherein the weight ratio of the base resin/chromium compound is in the range of from 95/5 to 75/25.

21. A highly corrosion-resistant surface-treated steel plate as set forth in claim 14 or 15, wherein the amount (dry base) deposited of chromium in the chromate film is 10 to 200 mg/m$^2$, as calculated as the metallic chromium, and the amount deposited of the film of the resin composition is 0.3 to 2.0 g/m$^2$.

22. A highly corrosion-resistant surface-treated steel plate as set forth in claim 14, wherein the silica is hydrophobic silica.

23. A highly corrosion-resistant surface-treated steel plate as set forth in claim 14, wherein the base resin/polyisocyanate compound weight ratio is in the range of from 100/10 to 100/50.

24. A highly corrosion-resistant surface-treated steel plate comprising a zinc-deposited or zinc alloy-deposited steel plate, a chromate film formed on the surface of the steel plate and a film of a resin composition formed on the chromate film, said resin composition comprising a base resin obtained by adding at least one basic nitrogen atom and at least two primary hydroxyl groups to terminals of an epoxy resin, a polyisocyanate compound, silica and a silane compound, the base resin/silica weight ratio being in the range of from 99/1 to 30/70 and the amount of the silane compound being 0.1 to 15 parts per 100 parts of the sum of the base resin and silica.

25. A highly corrosion-resistant surface-treated steel plate as set forth in claim 24, wherein the base resin/polyisocyanate compound weight ratio is in the range of from 100/5 to 100/80.

26. A highly corrosion-resistant surface-treated steel plate as set forth in claim 24 or 25, wherein the base resin/silica weight ratio is in the range of from 90/10 to 30/70.

27. A highly corrosion-resistant surface-treated steel plate as set forth in claim 24 or 25, wherein the base resin/silica weight ratio is in the range of from 80/20 to 30/70.

28. A highly corrosion-resistant surface-treated steel plate as set forth in claim 24 or 25, wherein the amount (dry base) deposited of chromium in the chromate film is 10 to 200 mg/m$^2$, as calculated as metallic chromium, and the amount deposited of the film of the resin composition is 0.3 to 2.0 g/m$^2$.

29. A highly corrosion-resistant surface-treated steel plate as set forth in claim 24 or 25, wherein the amount (dry base) deposited of chromium in the chromate film is 1 to 1000 mg/m$^2$, as calculated as metallic chromium, and the amount deposited of the film of the resin composition is 0.1 to 3.5 g/m$^2$.

30. A highly corrosion-resistant surface-treated steel plate as set forth in claim 24, wherein the silica is hydrophobic silica.

31. A highly corrosion-resistant surface-treated steel plate as set forth in claim 24, wherein the base resin/polyisocyanate compound weight ratio is in the range of from 100/10 to 100/50.

32. A highly corrosion-resistant surface-treated steel plate comprising a zinc-deposited or zinc alloy-deposited steel plate, a chromate film formed on the surface of the steel plate and a film of a resin composition formed on the chromate film, said resin composition comprising a base resin obtained by adding at least one basic nitrogen atom and at least two primary hydroxyl groups to terminals of an epoxy resin, a polyisocyanate compound, silica, a silane compound and a chromium compound, the base resin/silica weight ratio being in the range of from 99/1 to 30/70, the amount of the silane compound being 0.1 to 15 parts per 100 parts of the sum of the base resin and silica and the base resin/chromium compound weight ratio being in the range of from 99/1 to 60/40.

33. A highly corrosion-resistant surface-treated steel plate as set forth in claim 32, wherein the base resin/polyisocyanate compound weight ratio is in the range of from 100/5 to 100/80.

34. A highly corrosion-resistant surface-treated steel plate as set forth in claim 32 or 33, wherein the base resin/silica weight ratio is in the range of from 90/10 to 50/50.

35. A highly corrosion-resistant surface-treated steel plate as set forth in claim 32 or 33, wherein the base resin/chromium compound weight ratio is in the range of from 97/3 to 65/35.

36. A highly corrosion-resistant surface-treated steel plate as set forth in claim 32 or 33, wherein the amount (dry base) deposited of chromium in the chromate film is 1 to 1000 mg/m$^2$, as calculated as metallic chromium and the amount deposited of the film of the resin composition is 0.1 to 3.5 g/m$^2$.

37. A highly corrosion-resistant surface-treated steel plate as set forth in claim 32 or 33, wherein the base resin/silica weight ratio is in the range of from 80/20 to 60/40.

38. A highly corrosion-resistant surface-treated steel plate as set forth in claim 32 or 33, wherein the base resin/chromium compound weight ratio is in the range of from 95/5 to 75/25.

39. A highly corrosion-resistant surface-treated steel plate as set forth in claim 32 or 33, wherein the amount (dry base) deposited of chromium in the chromate film is 10 to 200 mg/m$^2$, as calculated as metallic chromium and the amount deposited of the film of the resin composition is 0.3 to 2.0 g/m$^2$.

40. A highly corrosion-resistant surface-treated steel plate as set forth in claim 32, wherein the silica is hydrophobic silica.

41. A highly corrosion-resistant surface-treated steel plate as set forth in claim 32, wherein the base resin/polyisocyanate compound weight ratio is in the range of from 100/10 to 100/50.

42. A highly corrosion-resistant surface-treated steel plate comprising a zinc-deposited or zinc alloy-deposited steel plate, a chromate film formed on the surface of the steel plate and a film of a resin composition formed on the chromate film, said resin composition comprising a base resin obtained by adding at least one basic nitrogen atom and at least two primary hydroxyl groups to terminals of an epoxy resin and silica, the base resin/silica weight ratio being in the range of from 99/1 to 30/70.

43. A highly corrosion-resistant surface-treated steel plate as set forth in claim 42, wherein the base resin/silica weight ratio is in the range of from 90/10 to 30/70.

44. A highly corrosion-resistant surface-treated steel plate as set forth in claim 42 or 43, wherein the amount (dry base) deposited of chromium in the chromate film is 1 to 1000 mg/m$^2$, as calculated as metallic chromium and the amount deposited of the film of the resin composition is 0.1 to 3.5 g/m$^2$.

45. A highly corrosion-resistant surface-treated steel plate as set forth in claim 42 or 43, wherein the amount (dry base) deposited of chromium in the chromate film is 10 to 200 mg/m$^2$, as calculated as metallic chromium and the amount deposited of the film of the resin composition is 0.3 to 2.0 g/m$^2$.

46. A highly corrosion-resistant surface-treated steel plate as set forth in claim 42, wherein the silica is hydrophobic silica.

47. A highly corrosion-resistant surface-treated steel plate as set forth in claim 42, wherein the base resin/silica weight ratio is in the range of from 80/20 to 30/70.

48. A highly corrosion-resistant surface-treated steel plate comprising a zinc-deposited or zinc alloy-deposited steel plate, a chromate film formed on the surface of the steel plate and a film of a resin composition formed on the chromate film, said resin composition comprising a base resin obtained by adding at least one basic nitrogen atom and at least two primary hydroxyl groups to terminals of an epoxy resin, silica and a chromium compound, the base resin/silica weight ratio being in the range of from 99/1 to 30/70 and the base resin/chromium compound weight ratio being in the range of from 99/1 to 60/40.

49. A highly corrosion-resistant surface-treated steel plate as set forth in claim 48, wherein the base resin/silica weight ratio is in the range of from 90/10 to 50/50.

50. A highly corrosion-resistant surface-treated steel plate as set forth in claim 48 or 49, wherein the base resin/chromium compound weight ratio is in the range of from 97/3 to 65/35.

51. A highly corrosion-resistant surface-treated steel plate as set forth in claim 48 or 49, wherein the amount (dry base) deposited of chromium in the chromate film is 1 to 1000 mg/m$^2$, as calculated as metallic chromium and the amount deposited of the film of the resin composition is 0.1 to 3.5 g/m$^2$.

52. A highly corrosion-resistant surface-treated steel plate as set forth in claim 48 or 49, wherein the base resin/chromium compound weight ratio is in the range of from 95/5 to 75/25.

53. A highly corrosion-resistant surface-treated steel plate as set forth in claim 48 or 49, wherein the amount (dry base) deposited of chromium in the chromate film is 10 to 200 mg/m$^2$, as calculated as metallic chromium and the amount deposited of the film of the resin composition is 0.3 to 2.0 g/m$^2$.

54. A highly corrosion-resistant surface-treated steel plate as set forth in claim 48, wherein the silica is hydrophobic silica.

55. A highly corrosion-resistant surface-treated steel plate as set forth in claim 48, wherein the base resin/silica weight ratio is in the range of from 80/20 to 60/40.

56. A highly corrosion-resistant surface-treated steel plate as set forth in any one of claims 1, 6, 14, 24, 32, 42 and 48, wherein an alkyl-etherified amino resin is incorporated as a crosslinking agent in the film of the resin composition.

57. A highly corrosion-resistant surface-treated steel plate as set forth in any one of claims 1, 6, 14, 24, 32, 42 and 48, wherein a resin other than an epoxy resin, selected from the group consisting of acrylic resins, alkyd resins and polyester resins, is incorporated in the film of the resin composition.

58. A highly corrosion-resistant surface-treated steel plate as set forth in any one of claims 1, 6, 14, 24, 32, 42 and 48, wherein the zinc-deposited or zinc alloy-deposited film, the chromate film and the film of the resin composition are arranged on one surface of the steel plate substrate in this order from the surface side of the steel plate substrate, and the other surface of the steel plate substrate is not deposited with a metal.

59. A highly corrosion-resistant surface-treated steel plate as set forth in any one of claims 1, 6, 14, 24, 32, 42 and 48, wherein the zinc-deposited or zinc alloy-deposited film, the chromate film and the film of the resin composition are arranged on one surface of the steel plate substrate in this order from the surface side of the steel plate substrate and the other surface of the steel plate substrate is deposited with a metal.

60. A highly corrosion-resistant surface-treated steel plate as set forth in any one of claims 1, 6, 14, 24, 32, 42 and 48, wherein the zinc-deposited or zinc alloy-deposited film, the chromate film and the film of the resin composition are arranged on each of the surfaces of the steel plate substrate in this order from the surface of the steel plate substrate.

61. A highly corrosion-resistant surface-treated steel plate as set forth in any one of claims 1, 6, 14, 24, 32, 42, 48, wherein the zinc alloy-deposited steel plate is a zinc/nickel alloy-deposited steel plate.

62. A highly corrosion-resistant surface-treated steel plate as set forth in claim 61, wherein at least one element selected from the group consisting of Ni, Fe, Mo, Co, AL and Cr is incorporated in the basic component of the deposited zinc alloy.

63. A highly corrosion-resistant surface-treated steel plate as set forth in claim 61, wherein the nickel content in the zinc/nickel alloy-deposited film is 5 to 20% by weight.

64. A highly corrosion-resistant surface-treated steel plate as set forth in any one of claims 1, 6, 14, 24, 32, 42, 48, wherein the zinc alloy-deposited steel plate is a zinc/iron alloy-deposited steel plate.

65. A highly corrosion-resistant surface-treated steel plate as set forth in claim 64, wherein at least one element selected from the group consisting of Ni, Fe, Mo, Co, Al and Cr is incorporated in the basic component of the deposited zinc alloy.

66. A highly corrosion-resistant surface-treated steel plate as set forth in any one of claims 1, 6, 14, 24, 32, 42, 48, wherein the zinc alloy-deposited steel plate is a zinc/manganese alloy-deposited steel plate.

67. A highly corrosion-resistant surface-treated steel plate as set forth in claim 66, wherein the manganese content in the zinc/manganese alloy-deposited film is 30 to 85% by weight.

68. A highly corrosion-resistant surface-treated steel plate as set forth in claim 66, wherein at least one element selected from the group consisting of Ni, Fe, Mo, Co, Al and Cr is incorporated in the basic component of the deposited zinc alloy.

69. A highly corrosion-resistant surface-treated steel plate as set forth in any one of claims 1, 6, 14, 24, 32, 42, 48, wherein the zinc alloy-deposited steel plate is a zinc/aluminum alloy-deposited steel plate.

70. A highly corrosion-resistant surface-treated steel plate as set forth in claim 69, wherein at least one element selected from the group consiting of Ni, Fe, Mo, Co, Al and Cr is incorporated in the basic component of the deposited zinc alloy.

71. A highly corrosion-resistant surface-treated steel plate as set forth in any one of claims 1, 6, 14, 24, 32, 42, 48, wherein the zinc alloy-deposited steel plate is a zinc/cobalt/chromium alloy-deposited steel plate.

72. A highly corrosion-resistant surface-treated steel plate as set forth in claim 71, wherein at least one element selected from the group consisting of Ni, Fe, Mo, Co, Al and Cr is incorporated in the basic component of the deposited zinc alloy.

73. A highly corrosion-resistant surface-treated steel plate as set forth in any one of claims 1, 6, 14, 24, 32, 42, 48, wherein the zinc-deposited or zinc alloy-deposited film comprises at least two metal deposition layers.

74. A highly corrosion-resistant surface-treated steel plate as set forth in claim 73, wherein the zinc alloy-deposited film comprises at least two zinc/iron alloy-deposited layers differing in iron content.

* * * * *

UNITED STATES PATENT AND TRADEMARK OFFICE
CERTIFICATE OF CORRECTION

PATENT NO.  : 4,775,600
DATED       : October 4, 1988
INVENTOR(S) : Adaniya, et al.

It is certified that error appears in the above-indentified patent and that said Letters Patent is hereby corrected as shown below:

On the title page, item (73) Assignee: insert --Kansai Paint Co., Ltd., Hyogo-ken, Japan--.

Column 23, Table 4, Box No. 6 delete "R 200" and substitute therefor --200--.

Column 29, Table 8, Box No. 9 delete "A 100" and substitute therefor --B 100--.

Column 29, Table 8, Box No. 9 delete "formalin" and substitute therefor --morpholine--.

Column 35, Table 13, Box No. 9 delete " " " and substitute therefor --B 100--.

Column 35, Table 13, Box No. 9 delete "formalin" and substitute therefor --morpholine--.

Column 42, Table 20, Box No. 5 delete "R 200" and substitute therefor --200--.

Signed and Sealed this

Twenty-eighth Day of June, 1994

Attest:

BRUCE LEHMAN

*Attesting Officer*    *Commissioner of Patents and Trademarks*